US010906253B2

(12) United States Patent
Matlack et al.

(10) Patent No.: US 10,906,253 B2
(45) Date of Patent: Feb. 2, 2021

(54) TOOL ASSEMBLY FOR COMPOSITE PART FABRICATION

(71) Applicant: THE BOEING COMPANY, Chicago, IL (US)

(72) Inventors: Michael P. Matlack, St. Charles, MO (US); Dylan E. Polus, Glen Carbon, IL (US)

(73) Assignee: THE BOEING COMPANY, Chicago, IL (US)

( * ) Notice: Subject to any disclaimer, the term of this patent is extended or adjusted under 35 U.S.C. 154(b) by 229 days.

(21) Appl. No.: 16/009,062

(22) Filed: Jun. 14, 2018

(65) Prior Publication Data
US 2019/0381751 A1 Dec. 19, 2019

(51) Int. Cl.
B29C 70/34 (2006.01)
B33Y 80/00 (2015.01)
(Continued)

(52) U.S. Cl.
CPC ........ B29C 70/342 (2013.01); B29C 33/3842 (2013.01); B29C 64/10 (2017.08); B33Y 80/00 (2014.12); B33Y 10/00 (2014.12)

(58) Field of Classification Search
CPC ... B29C 70/342; B29C 64/10; B29C 33/3842; B29C 33/301; B29C 33/202; B29C 70/443; B33Y 80/00; B33Y 10/00; F16B 5/0012
See application file for complete search history.

(56) References Cited

U.S. PATENT DOCUMENTS 5,266,137 A * 11/1993 Hollingsworth ...... B29C 53/824
156/156
8,535,042 B1 * 9/2013 Kirkpatrick ............. B29C 51/20
425/388
(Continued)

FOREIGN PATENT DOCUMENTS

EP 2918356 A1 9/2015
EP 2927508 A1 10/2015
(Continued)

OTHER PUBLICATIONS

Stratasys, "FDM for Composite Tooling, Design Guide", May 2017, https://pdf.directindustry.com/pdf/stratasys/design-guide-fdm-composite-tooling/25745-704327.html. (Year: 2017).*
(Continued)

Primary Examiner — Michael N Orlando
Assistant Examiner — Christopher W Raimund
(74) Attorney, Agent, or Firm — Moore Intellectual Property Law, PLLC

(57) ABSTRACT

A tool assembly includes a first piece, a second piece, and a fastener. The first piece has a first joint portion including a top surface and at least a first interlock surface. The second piece has a second joint portion configured to interlock with the first joint portion. The second joint portion includes a top surface and at least a second interlock surface that is complementary to the first interlock surface. The fastener extends through the first and second joint portions. The first interlock surface and the top surface of the first joint portion form an obtuse angle corner and the second interlock surface and the top surface of the second joint portion form an acute angle corner. The first interlock surface is configured to contact the second interlock surface to inhibit relative movement between the first piece and the second piece along a longitudinal axis of the tool assembly.

20 Claims, 19 Drawing Sheets

(51) Int. Cl.
B29C 64/10 (2017.01)
B29C 33/38 (2006.01)
B33Y 10/00 (2015.01)

(56) References Cited

U.S. PATENT DOCUMENTS

2014/0353916 A1* 12/2014 Dull .................. B29C 70/44
                                                        277/312
2018/0057188 A1    3/2018 Deck et al.

FOREIGN PATENT DOCUMENTS

EP      2895318 B1    7/2019
WO    2014042813 A1    3/2014

OTHER PUBLICATIONS

Black, "Bonding Technology: Thermosetting Structural Adhesives", Composites World, Jun. 2007, https://www.compositesworld.com/articles/bonding-technology-thermosetting-structural-adhesives) (Year: 2007).*

SurfaceID, "Choosing the Right Type of Seals", SurfaceID Blog, Aug. 2017, https://surfaceid.com/blog/choosing-right-type-seals/. (Year: 2017).*

Extended European Search Report for application No. 191715333, dated Jan. 21, 2020, 13 pgs.

The partial European search report (R. 64 EPC) dated Dec. 5, 2019 issued in corresponding EP Application No. 19171533.3, 13 pgs.

* cited by examiner

SECTION A-A

SECTION A-A

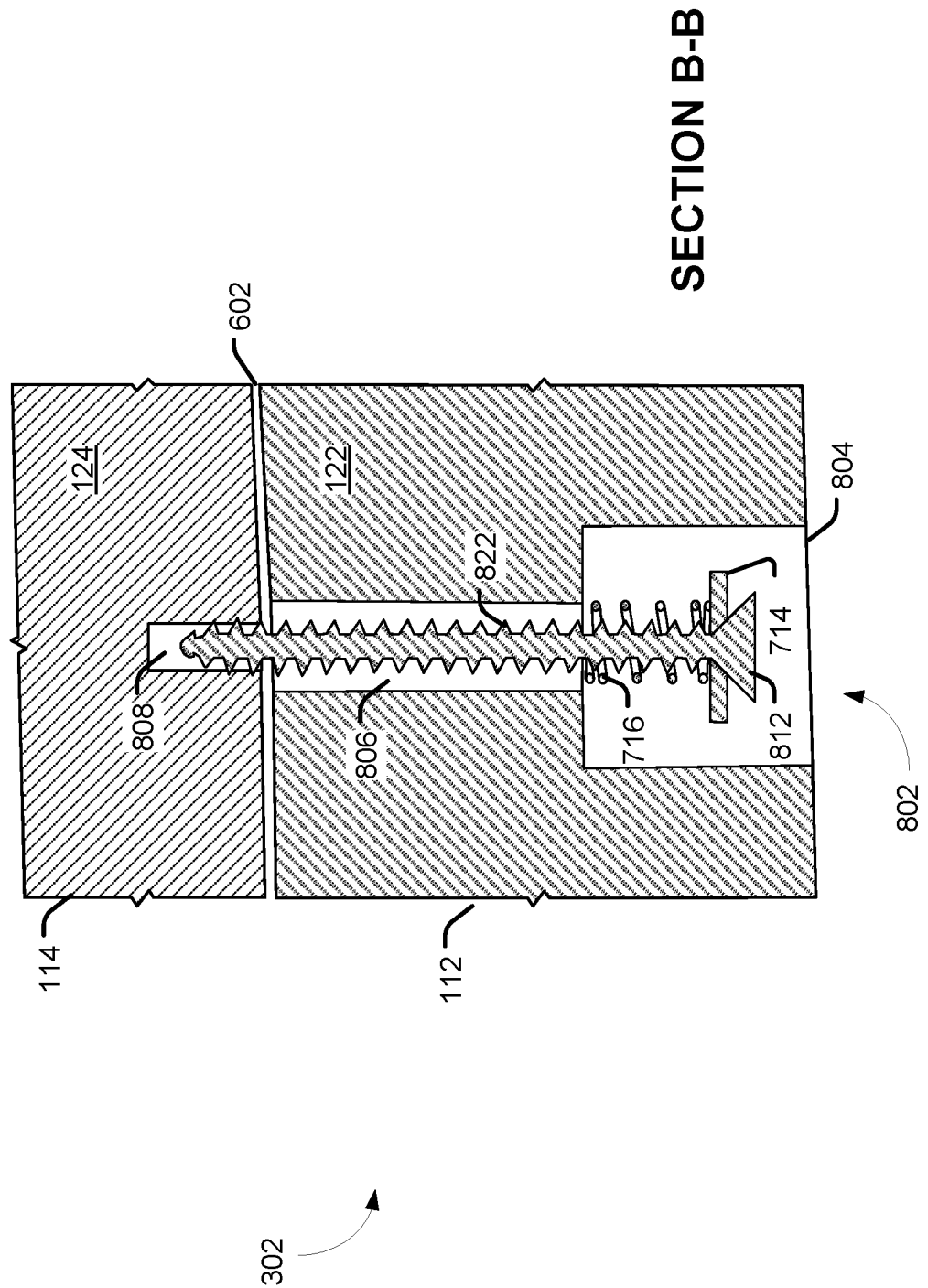

SECTIONS A-A

SECTIONS A-A

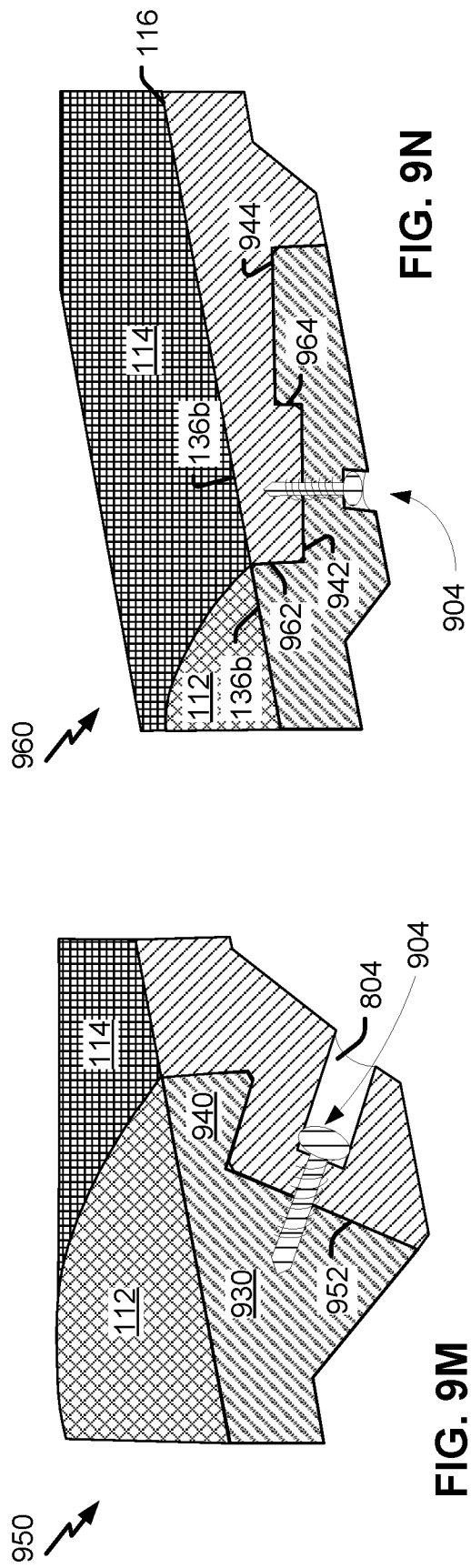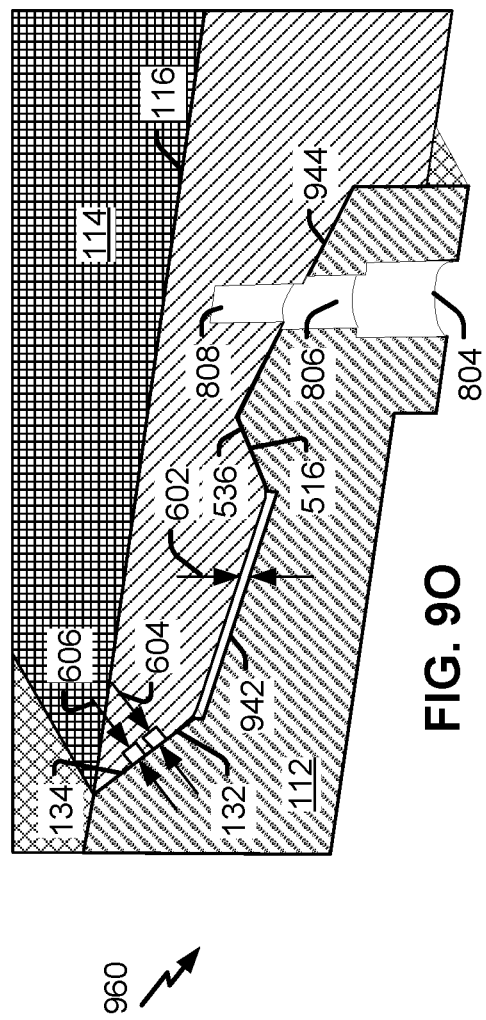
SECTIONS A-A
FIG. 9M
FIG. 9N
FIG. 9O

TOOL ASSEMBLY FOR COMPOSITE PART FABRICATION

GOVERNMENT LICENSE RIGHTS

The invention was made with Government support under Contract No. FA8650-17-C-5715 awarded by the United States Department of Defense. The government has certain rights in this invention.

FIELD OF THE DISCLOSURE

The present disclosure is generally related to tool assemblies for composite part fabrication and joints thereof.

BACKGROUND

Forming large composite parts (also referred to as working components), such as composite aircraft parts (e.g., wings, fuselage sections, etc.) can require large tools. Such tools include draping tools, support tools, layup surface tools (commonly referred to as molds or mandrels), etc. These tools are used in a variety of composite part formation processes, such as hand layup, automated layup, draping, hot draping, automated fiber placement, automated tape laying, curing, and trimming. These tools include surfaces (e.g., a layup surface) that are used to form or support formation of the composite parts. The layup surface may include shapes, contours, and/or geometries that conform to design specifications and are complementary to the composite parts being formed.

Such tools are commonly made of metal and are monolithic pieces (i.e., a single structure composed of multiple permanently joined pieces, such as by welded or bonded joints). Additionally, these tools have precise contoured surfaces (e.g., within allowable tolerances) and must be able to withstand the weight of the composite part and rigors of forming the composite part. For example, a particular tool may be subjected to vacuum conditions (e.g., vacuum pressure) and high temperature conditions during composite formation and curing. If a tool deforms to become out of tolerance from prior use, is unable to maintain a vacuum condition, or is unable to maintain tolerances upon heating, weight, or vacuum conditions, the tool is unable to create parts and a new tool must be created. Production of the part may be halted until a new tool is available. Also, some times during a design process, multiple tool designs (e.g., prototype tools or iterations of tools) are generated to improve the formation process of the part. As such, current tools can have high fabrication costs and/or have long fabrication cycle times.

SUMMARY

In a particular implementation, a tool assembly includes a first piece having a first joint portion including a top surface and at least a first interlock surface. The tool assembly also includes a second piece having a second joint portion configured to interlock with the first joint portion, the second joint portion including a top surface and at least a second interlock surface that is complementary to the first interlock surface. The tool assembly further includes a fastener extending through the first and second joint portions. The first interlock surface and the top surface of the first joint portion form an obtuse angle corner and the second interlock surface and the top surface of the second joint portion form an acute angle corner. The first interlock surface is configured to contact the second interlock surface to inhibit relative movement between the first piece and the second piece along a longitudinal axis of the tool assembly.

In another particular implementation, a tool assembly includes a first piece having a top surface and a first joint portion including at least a first interlock surface. The tool assembly also includes a second piece having a second joint portion configured to interlock with the first joint portion, the second joint portion including a top surface and at least a second interlock surface that is complementary to the first interlock surface. The tool assembly further includes a fastener extending through the first and second joint portions. The first interlock surface and the top surface of the first piece form an obtuse angle corner and the second interlock surface and the top surface of the second joint portion form an acute angle corner. The first interlock surface is configured to contact the second interlock surface to inhibit relative movement between the first piece and the second piece along a longitudinal axis of the tool assembly.

In a particular implementation, a method of heating a tool assembly includes joining a first piece of the tool assembly with a second piece of the tool assembly via a first joint portion and a second joint portion. The method also includes inserting a fastener through the first and second joint portions of the tool assembly. The method further includes applying heat to the tool assembly, where upon heating, interlock surfaces of the first and second joint portions tighten.

In another particular implementation, a method of applying composite material to a tool assembly includes joining a first piece of the tool assembly with a second piece of the tool assembly via a first joint portion and a second joint portion, where the tool assembly includes a layup surface. The method further includes applying the composite material onto the layup surface. The layup surface is configured to support formation of a composite part and has a shape that is complementary to a shape of the composite part.

In yet another particular implementation, a method of making a tool assembly includes forming a first joint portion of a first piece of the tool assembly using an additive manufacturing process. The first joint portion includes a top surface and at least a first interlock surface. The method further includes forming a second joint portion of a second piece of the tool assembly using the additive manufacturing process. The second joint portion includes a top surface and at least a second interlock surface that is complementary to the first interlock surface.

By utilizing a tool assembly (e.g., a multi-piece tool), composite parts can be formed more quickly and with reduced costs as compared to one piece tools. Additionally, by utilizing a tool assembly with joint portions and interlock surfaces, the tool assembly can be fabricated to support formation of large composite pieces, such as aircraft wings and fuselage sections.

BRIEF DESCRIPTION OF THE DRAWINGS

FIG. 8 is a diagram that illustrates a cross-section of the tool assembly of FIG. 6 including a second fastener;

FIGS. 9A, 9B, 9C, 9D, 9E, 9F, 9G, 9H, 9I, 9J, 9K, 9L, 9M, 9N, and 9O are each a diagram that illustrates an example of joint portions of other examples of tool assemblies;

DETAILED DESCRIPTION

Figure 1:
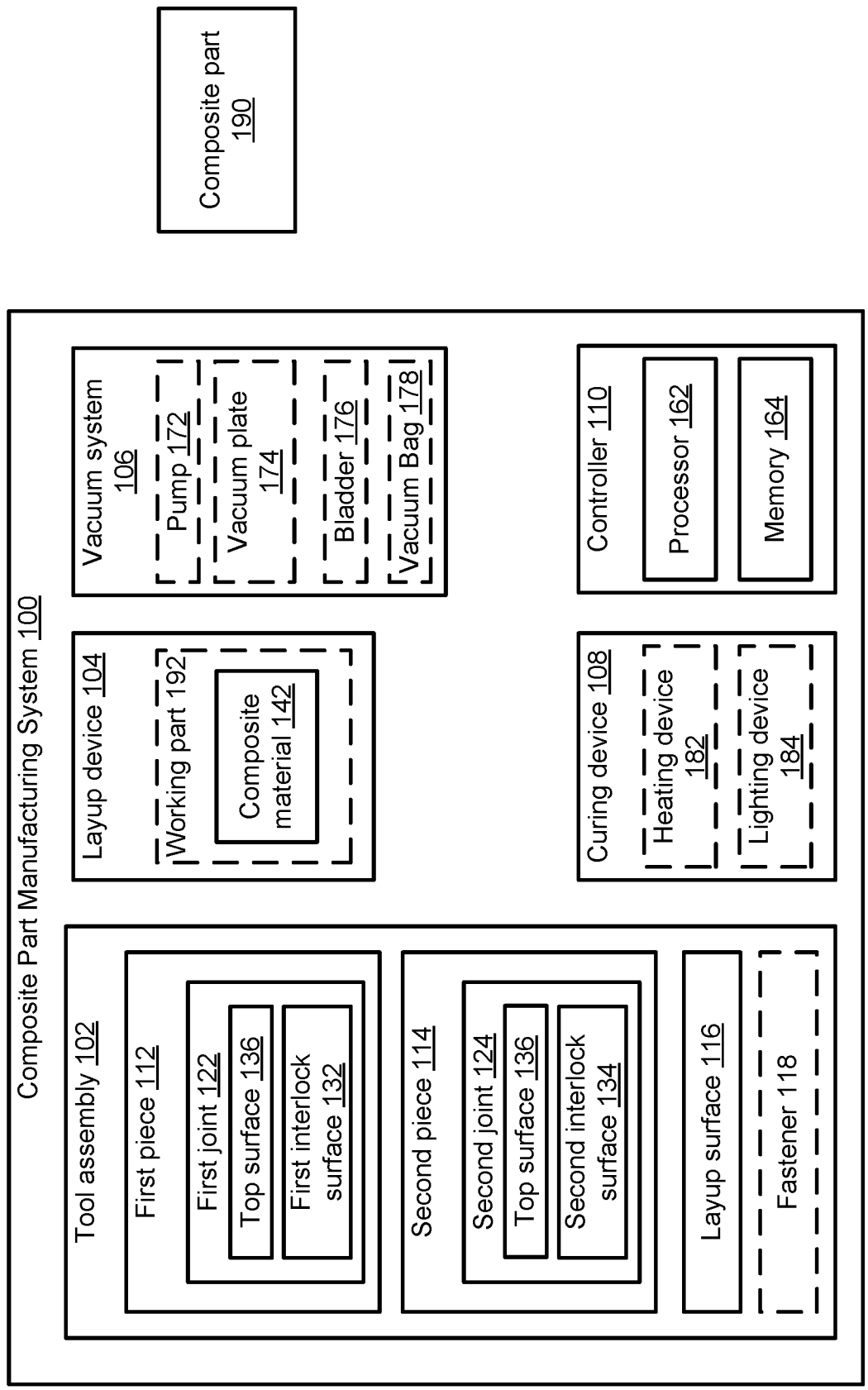
FIG. 1 is a block diagram that illustrates an example of a composite part manufacturing system.

Implementations disclosed herein enable formation of a composite part (e.g., curing a large composite part) using a tool assembly (i.e., a multi-piece tool). Examples of large composite parts in the context of an aircraft are wing components, such as the leading edge, the flaps, or other parts of the wing, and fuselage components of the aircraft. Other examples of large composite parts include rocket fuselages and stabilizers and ship hulls or skins. The pieces of the tool assembly are joined together by joint portions to form joints. The joint portions include one or more interlock surfaces that self-interlock and are able to withstand thermal expansion upon heating and maintain a vacuum seal and vacuum integrity. For example, thermal expansion of the pieces of the tool assembly tighten the vacuum seal between interlock surfaces. The joint portions interlock such that a layup surface of the tool assembly is within design tolerance (i.e., does not deform to a shape that is out of the designed or desired tolerance). Additionally, the joint portions are strong enough to enable handling of the tool assembly. In some implementations, the tool assembly includes one or more fasteners to enable thermal expansion and increase joint strength to enable tool handling and/or adhesive material (e.g., adhesive films or pastes) to further secure the tool assembly and maintain a vacuum seal and the vacuum integrity. While "adhesive material" is described herein, any suitable type of material that adheres or bonds components together, permanently or temporarily, can be used.

In some implementations, the tool assembly includes one or more additively manufactured pieces, such as pieces made by fused filament fabrication (FFF), such as fused deposition modeling (FDM), plastic jet printing (PJP), three-dimensional (3-D) printing, powder bed processing, selective heat sintering (SHS), stereolithography (SLA), selective laser melting (SLM), selective laser sintering (SLS), and the like. Additively manufactured tool pieces of tool assemblies are usually made from materials that are generally chemically inert, and thus bonded joints or bonded butt joints between additively manufactured tool pieces may be difficult to form. Additionally, additively manufactured tool pieces of tool assemblies are usually made from materials where the coefficient of thermal expansion is anisotropic (i.e., the tool piece expands differently in different directions). This anisotropic thermal expansion can decrease the ability of a tool assembly to maintain vacuum integrity in a heated tool usage environment (e.g., fabrication of composite parts). By using the joint portions with interlock surfaces described herein, tool assemblies can include one or more additively manufactured pieces and can support formation of large composite parts.

Multi-piece tool assemblies, such as the tool assemblies described herein, can have lower costs and reduced tool fabrication cycle time, as compared to monolithic metal tools. Additionally, as compared to monolithic metal tools or metal tool assemblies, multi-piece tool assemblies having additively manufactured pieces can have lower costs and reduced tool fabrication cycle time. The lower costs and reduced fabrication cycle time of tool assemblies having additively manufactured pieces can reduce costs and fabrication cycle time associated with manufacturing composite parts (e.g., large composite parts) and the systems which include the composite parts.

FIG. 1 illustrates an example of a composite part manufacturing system 100 that includes a tool assembly 102, a layup device 104, a vacuum system 106, a curing device 108, and a controller 110. The composite part manufacturing system 100 enables formation of composite parts, such as a composite part 190. The composite part manufacturing system 100 may include or correspond to a hand layup manufacturing system, an automated layup manufacturing system, a draping system, a hot draping system, an automated fiber placement system, an automated tape laying system, a composite part trimming system, or a combination thereof.

The tool assembly 102 includes two or more pieces 112, 114. As illustrated in the implementation illustrated in FIG. 1, the tool assembly includes a first piece 112 and a second piece 114. In some implementations, the first piece 112 and the second piece 114 are joined together, such as by interlocking, to form a layup surface 116. In other implementations, a particular piece of the two or more pieces 112, 114 includes the layup surface 116 or a subset of pieces of the two or more pieces 112, 114 of the tool assembly 102 includes the layup surface 116. The two or more pieces 112, 114 of the tool assembly 102 each include one or more joint portions 122, 124. As illustrated in the implementation illustrated in FIG. 1, the first piece 112 includes a first joint portion 122 and the second piece 114 includes a second joint portion 124. The second joint portion 124 is configured to interlock with the first joint portion 122. Each joint portion 122, 124 includes one or more interlock surfaces 132, 134. As illustrated in the implementation illustrated in FIG. 1, the first joint portion 122 includes a first interlock surface 132 and the second joint portion 124 includes a second interlock surface 134. Additionally, each joint portion 122, 124 includes a corresponding top surface 136. Specific joints and interlock surface arrangements (e.g., two interlock surfaces that are configured to be interlocked) are described further with reference to FIGS. 3-6 and 9A-9O.

Figure 2:
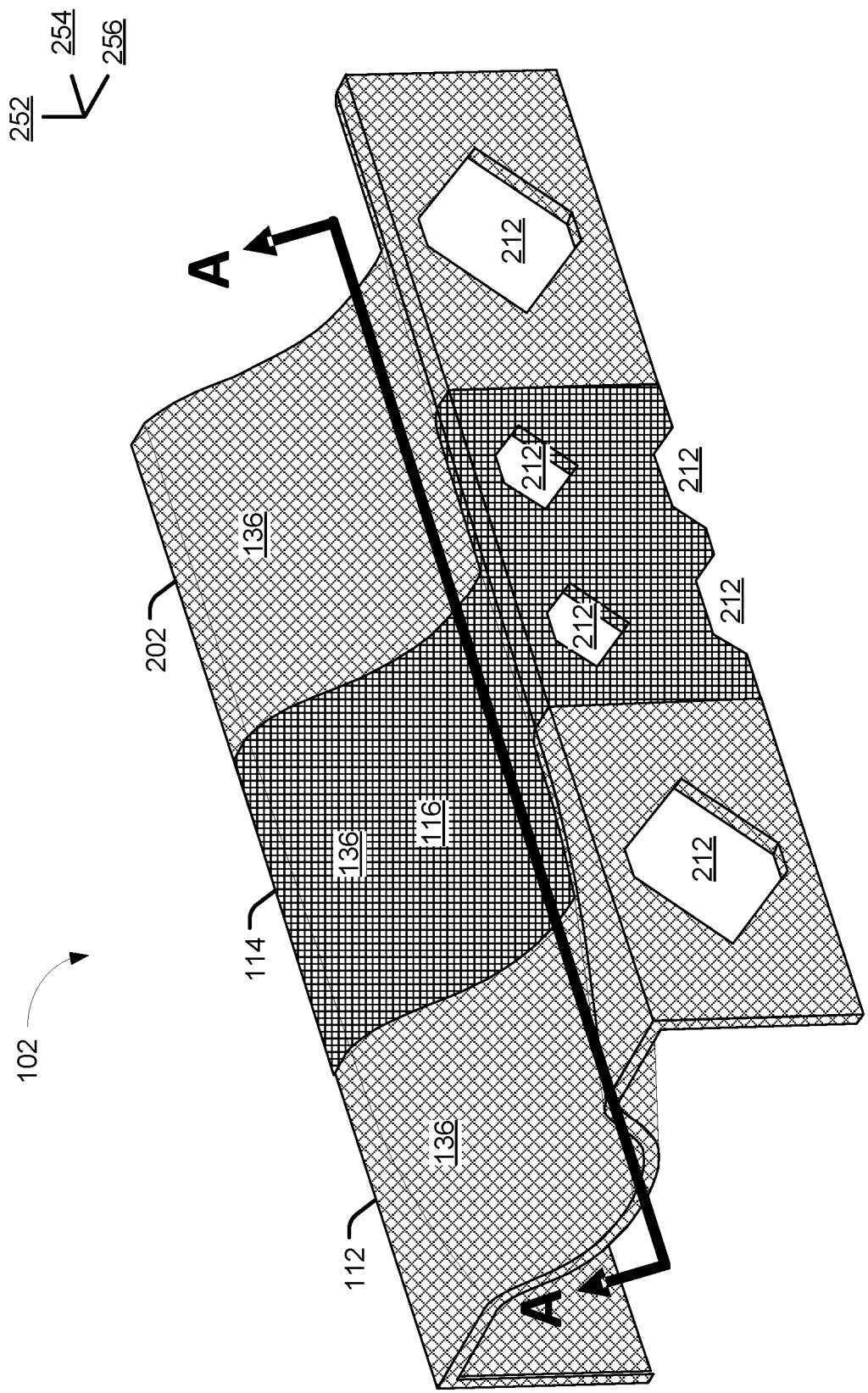
FIG. 2 is a diagram that illustrates an isometric view of an example of a tool assembly for use with the system of FIG. 1.

The first and second interlock surfaces 132, 134 are complementary interlock surfaces or interlocking surfaces. For example, the first and second interlock surfaces 132, 134 are positioned at complementary angles relative to a particular reference plane or surface. The first and second interlock surfaces 132, 134 are configured to interlock with each other and form a vacuum seal or maintain vacuum integrity. To illustrate, the first interlock surface 132 is configured to contact the second interlock surface 134 to inhibit relative movement between the first piece 112 and the second piece 114. The interlock surfaces 132, 134 may inhibit relative movement between the first piece 112 and the second piece 114 along a particular direction or axis or within a particular plane. As illustrated in FIG. 2, the interlock surfaces 132, 134 inhibit relative movement between the first piece 112 and the second piece 114 along a longitudinal axis 254. In other implementations, the interlock surfaces 132, 134 inhibit relative movement between the first piece 112 and the second piece 114 along a transverse axis 256 of FIG. 2.

The first and second interlock surfaces 132, 134 are also configured to relieve stress and strain from thermal expansion and handling. In some implementations, the first and second interlock surfaces 132, 134 are configured to "tighten" (e.g., form a tighter seal by pushing against other and/or by being forced toward each other) under high temperature conditions and/or vacuum conditions. For example, increasing the temperature of the joint portions 122, 124 can cause the joint portions 122, 124 to experience thermal expansion, which increases force and pressure on the first and second interlock surfaces 132, 134 such that the first and second interlock surfaces 132, 134 deform on a microscopic level to engage each other to a greater degree (e.g., a larger portion of the first and second interlock surfaces 132, 134 contact each other on a microscopic level as compared to the contact between the interlock surfaces 132, 134 prior to thermal expansion). This deformation may enable a more airtight seal and/or generate more friction (i.e., more resistance to movement).

The layup surface 116 is defined by one or more surfaces (e.g., the top surfaces 136) of the pieces 112, 114 of the tool assembly 102 when joined together. In certain examples, any surface of the pieces 112, 114 can be or define the layup surface 116. The layup surface 116 is configured to support formation of the composite part 190. For example, the layup surface 116 acts as a form, mold, or mandrel for the layup device 104 and composite material 142. To illustrate, a shape of the layup surface 116 of the tool assembly 102 is similar to or complementary to a shape of the composite part 190. The composite material 142 (e.g., plies of fibrous material embedded in a resin matrix) conform to the shape of the layup surface 116 of the tool assembly 102 under heat and/or pressure to form the composite part 190.

The layup device 104 is configured to position or deposit the composite material 142 on the layup surface 116 of the tool assembly 102. The layup device 104 includes or corresponds to an automated layup machine, an automated tape laying machine, or an automated fiber placement machine. The composite material 142 may be in the form of tows, tape, plies, etc. The composite material 142 is two or more constituent materials combined to create a material with material properties different then the individual material characteristics, such as honeycomb panels, fiber and resin, etc. In some examples, the tool assembly 102 described herein can be used to make parts from a composite material 142 that is a combination of a fabric or fiber (fiberglass, carbon, metallic carbon fiber, KEVLAR®, aramid, aluminized fiberglass, etc.) and a resin (epoxy, bis-Maleimide (BMI), vinyl ester, polyester, etc.).

In other implementations, the composite part manufacturing system 100 does not include the layup device 104. In such implementations, the layup device 104 is separate from the composite part manufacturing system 100 or the layup is done manually by hand.

The vacuum system 106 includes one or more components configured to generate and maintain vacuum conditions (e.g., vacuum pressure, which is a pressure less than an ambient pressure, or a vacuum seal). For example, the vacuum system 106 includes a pump 172, a vacuum plate 174, and a bladder 176 configured to generate and maintain vacuum conditions between or around the composite material 142 and the tool assembly 102. As another example, the vacuum system 106 includes the pump 172 and a vacuum bag 178. The vacuum system 106 generates and maintains the vacuum conditions during at least a portion of the fabrication process of the composite part 190.

The curing device 108 is configured to cure the composite material 142 to form the composite part 190. The curing device 108 can include a heating device 182, a lighting device 184, or a combination thereof. For example, the curing device 108 may include or correspond to a heater, a laser, an oven, an autoclave, etc. Additionally or alternatively, the curing device 108 includes or corresponds to an ultraviolet light source.

The controller 110 includes a processor 162 and a memory 164. The memory 164 stores computer-executable instructions (e.g., a program of one or more instructions). The processor 162 is configured to execute the computer-executable instructions stored in the memory 164. The instructions, when executed, cause one or more components of the composite manufacturing system, to perform one or more operations of the methods described with reference to FIGS. 14 and 15.

The controller 110 is configured to control one or more components of the composite part manufacturing system 100. For example, the controller 110 may control or coordinate operation of the layup device 104, the vacuum system 106, the curing device 108, or a combination thereof. To illustrate, the controller 110 generates and transmits one or more commands to the one or more components of the composite part manufacturing system 100.

Prior to operation of the composite part manufacturing system 100, the tool assembly 102 is assembled. For example, the first joint portion 122 of the first piece 112 is mated with the second joint portion 124 of the second piece 114 to form the tool assembly 102 and the layup surface 116 thereof. As the first and second pieces 112, 114 may be large pieces (e.g., 5 feet by 5 feet or 10 feet by 10 feet sections), machinery (e.g., a forklift, a power jack, etc.) may be used to move and manipulate the first and second pieces 112, 114.

During operation of the composite part manufacturing system 100, the layup device 104 applies or deposits the composite material 142 onto the layup surface 116 of the tool assembly 102 responsive to receiving commands from the controller 110. The vacuum system 106 generates and maintains vacuum conditions (e.g., vacuum pressure or vacuum seal) and the curing device 108 applies heat, light, or both, to cure the composite material 142 responsive to receiving commands from the controller 110. The composite material 142 undergoes chemical reactions and/or deforms to form the composite part 190 during application of the heat, the light, or both. The formed composite part 190 has a contoured surface that matches a contoured surface (e.g., the layup surface 116) of the tool assembly.

In other implementations, a working part 192 is placed upon the layup surface 116 of the tool assembly 102 by the layup device 104, machinery, or by hand. The working part 192 is then trimmed (e.g., cut, machined, bent, etc.) into the composite part 190. The working part 192 may be formed by one or more steps of the process described above in creating the composite part 190.

In some implementations, the pieces 112, 114 of the tool assembly 102 are manufactured from a thermoplastic polymer material (e.g., Acrylonitrile-Butadiene-Styrene (ABS) material or carbon filled ABS material), a thermoset polymer material, or another polymer material. The pieces 112, 114 of the tool assembly 102 may be built-up using an additive manufacturing process, such as fused filament fabrication, fused deposition modeling, plastic jet printing, 3-D printing, powder bed processing, selective heat sintering, stereolithography, selective laser melting, selective laser sintering, and the like.

In some such implementations, the pieces 112, 114 of the tool assembly 102 are joined with one or more fasteners 118, adhesives, or a combination thereof, as described with reference to FIGS. 6-8. The adhesives are configured to help maintain vacuum integrity, and the fasteners 118 are configured to support movement of the tool assembly 102 thermal expansion of the tool assembly 102 and/or setting of the adhesive material. As an illustrative example, the tool assembly 102 includes a fastener 118 extending through the first and second joint portions 122, 124.

Thus, the composite part manufacturing system 100 may enable fabrication of large composite parts 190 using the tool assembly 102. Particularly, the composite part manufacturing system 100 may enable fabrication of large composite parts 190 using the tool assembly 102, which is formed from pieces 112, 114 that have been additively manufactured. Because the tool assembly 102 has reduced costs and fabrication time, fabrication of the composite parts has reduced costs and design time, as compared to metal one piece tools. Additionally, by using the tool assembly 102, including the joint portions 122, 124, the composite part manufacturing system 100 can form larger composite parts as compared to using smaller tool assemblies joined by butt joints to form smaller composite parts.

FIG. 2 is a diagram that illustrates an isometric view of an example of a tool assembly 102. The diagram of FIG. 2 illustrates the tool assembly 102 in a vertical axis 252, a longitudinal axis 254, and a transverse axis 256. As illustrated in FIG. 2, the tool assembly 102 includes the first piece 112, the second piece 114, and a third piece 202. FIG. 2 illustrates a diagram of a longitudinally aligned tool assembly 102, in which the pieces 112, 114, 202 are arranged in the longitudinal axis 254. In other implementations, the tool assembly 102 may be circumferentially aligned, such as aligned about a center of a circle along at least a portion of a circumference of the circle. In a particular implementation, the tool assembly 102 includes one or more circumferentially aligned pieces, one or more longitudinally aligned pieces, or a combination thereof.

As illustrated in FIG. 2, the layup surface 116 is formed by, or corresponds to, the top surfaces 136 of the pieces 112, 114, 202. In other implementations, the layup surface 116 includes one or more other surfaces of the pieces 112, 114, 202, such as side surfaces, bottom surfaces, cutout surfaces (e.g., surfaces of cutouts 212), or a combination thereof.

In some implementations, one or more of the pieces 112, 114, 202 include the cutouts 212. The cutouts 212 are configured to reduce a weight and a volume of the tool assembly 102, to provide a portion of the layup surface 116, to trim the composite part 190, or a combination thereof. Additionally, the cutouts 212 may enable transportation of the tool assembly 102 and the pieces 112, 114, 202 thereof. For example, forklift forks can be inserted through one or more of the cutouts 212 to lift, move, manipulate, and assemble the tool assembly 102. Additionally or alternatively, one or more pieces 112, 114, 202 of the tool assembly 102 include ribs or supports (not shown) to enable moving or manipulating the tool assembly 102 or the pieces 112, 114, 202 thereof. For examples, the ribs or supports may form channels or guides for the forks of the forklift or lifting means of another moving apparatus.

Figure 9A:
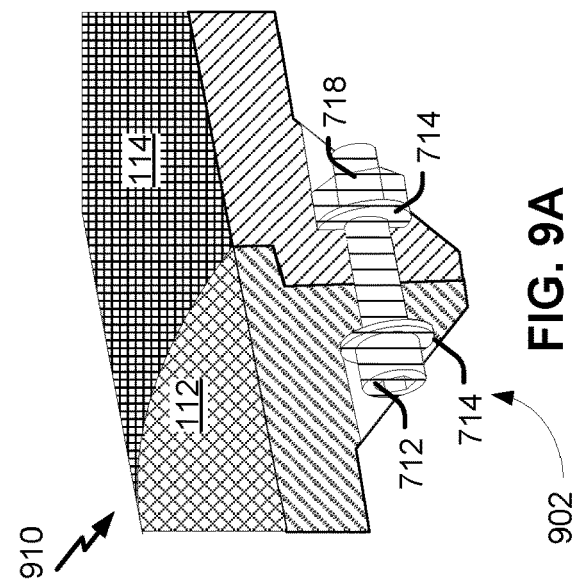

The pieces 112, 114, 202 are joined by joint portions, such as the joint portions 122, 124 of FIG. 1, as described and illustrated with reference to FIG. 3. FIG. 2 also depicts cross-section line A-A oriented along the longitudinal axis 254 passing through the pieces 112, 114, 202. FIGS. 9A-9O further illustrate and describe other examples of joint portions, such as the joint portions 122, 124 of FIG. 1, of the pieces 112, 114, 202.

Figure 3:
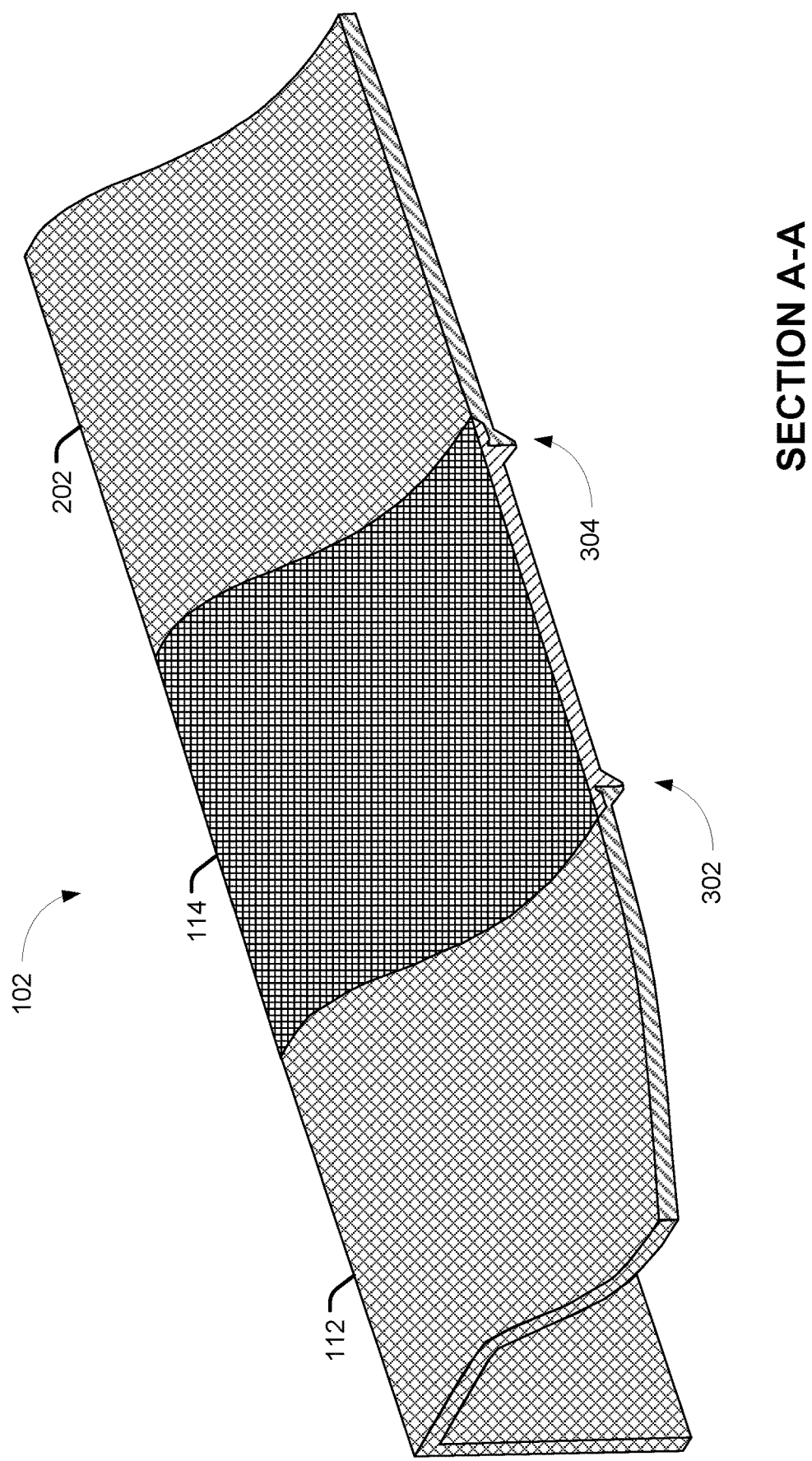
FIG. 3 is a diagram that illustrates an isometric view of a cross-section of the tool assembly of FIG. 2 depicting joints thereof.

FIG. 3 is a diagram that illustrates an isometric view of a cross-section line A-A of the tool assembly 102 of FIG. 2 depicting joints 302, 304 thereof. FIG. 3 illustrates an example joint scheme of the tool assembly 102. As illustrated in FIG. 3, the tool assembly 102 includes the first piece 112 having a female joint portion, a second piece 114 having two male joint portions, and a third piece 202 having a female joint portion. In other implementations, the tool assembly 102 may include one or more pieces having one male joint portion, one female joint portion, two male joint portions, two female joint portions, one male and female joint portion, or a combination thereof. A first joint 302 is formed by the first and second pieces 112, 114, and a second joint 304 is formed by the second and third pieces 114, 202, as illustrated and described further with reference to FIG. 4.

In some implementations, the joints 302, 304 extend in the transverse axis 256 along the width of the pieces 112, 114, 202. In other implementations, the pieces 112, 114, 202 include one or more sections of joints 302, 304 along the transverse axis 256. For example, the pieces 112, 114, 202 are joined by one or more sections of joints 302, 304 and by sections of one or more other joints (e.g., butt joints) positioned between the sections of joints 302, 304 along the transverse axis 256.

Figure 4:
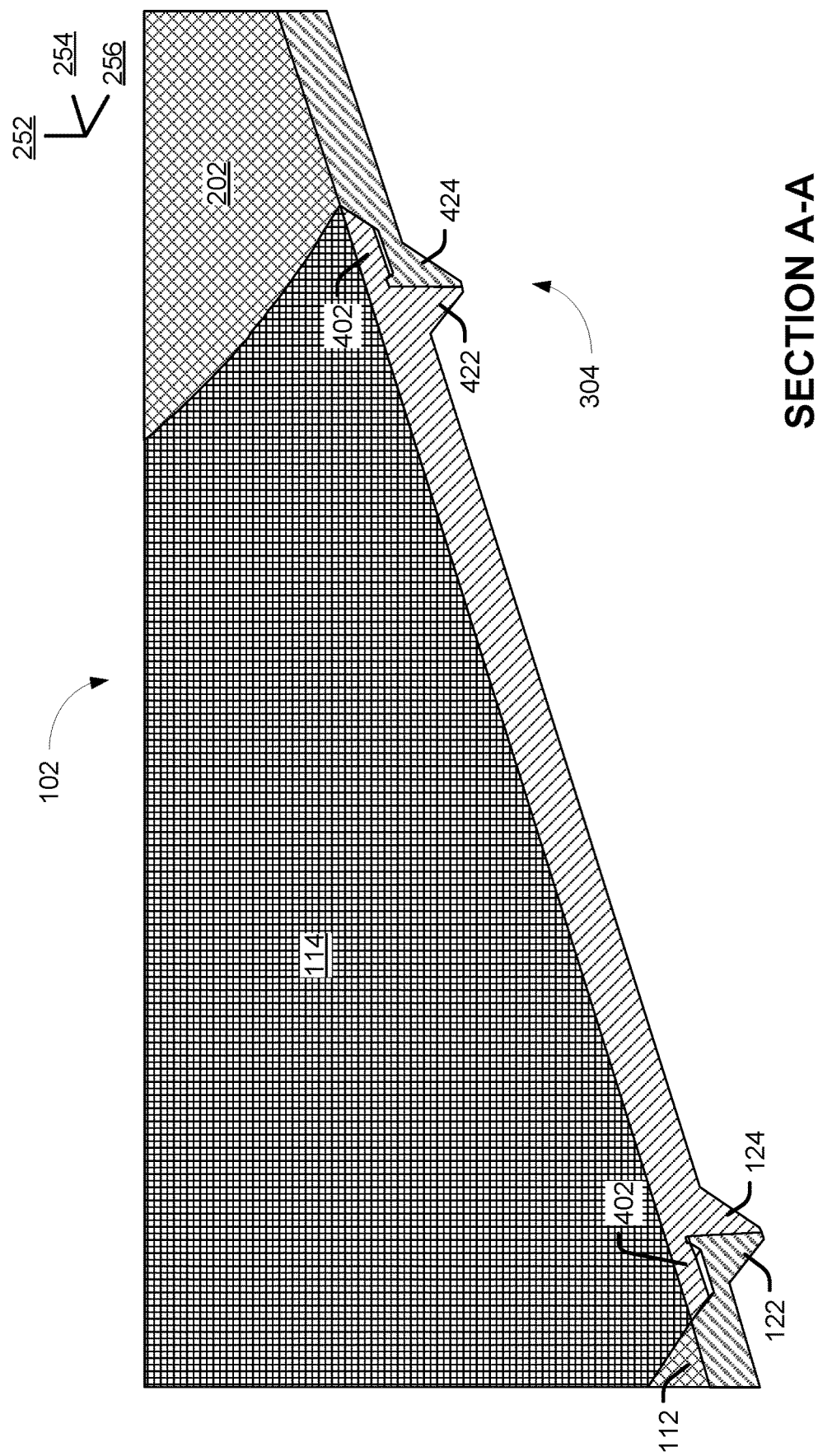
FIG. 4 is another diagram that illustrates an expanded isometric view of the cross-section of the tool assembly of FIG. 3 depicting joints thereof.

FIG. 4 is another diagram that illustrates an expanded isometric view of the cross-section of the tool assembly 102 of FIG. 3 depicting the joints 302, 304 thereof. As illustrated in FIG. 4, the second piece 114 includes a third joint portion 422 and the third piece 202 includes a fourth joint portion 424. The third joint portion 442 of the second piece 114 is configured to join with the fourth joint portion 424 of the third piece 202 of the tool assembly 102. Thus, FIG. 4 depicts the first joint 302 formed by the first and second joint portions 122, 124 of the first and second pieces 112, 114, and the second joint 304 formed by the third and fourth joint portions 422, 424 of the second and third pieces 114, 202.

In some implementations, the third joint portion 442 has a shape similar to the first joint portion 122 or the second joint portion 124. As illustrated in the implementation shown in FIG. 4, the third joint portion 442 has a shape (e.g., a male joint portion shape) that is similar to a shape of the second joint portion 124 and the fourth joint portion 444 has a shape (e.g., female joint portion shape) that is similar to a shape of the first joint portion 122.

Figure 5:
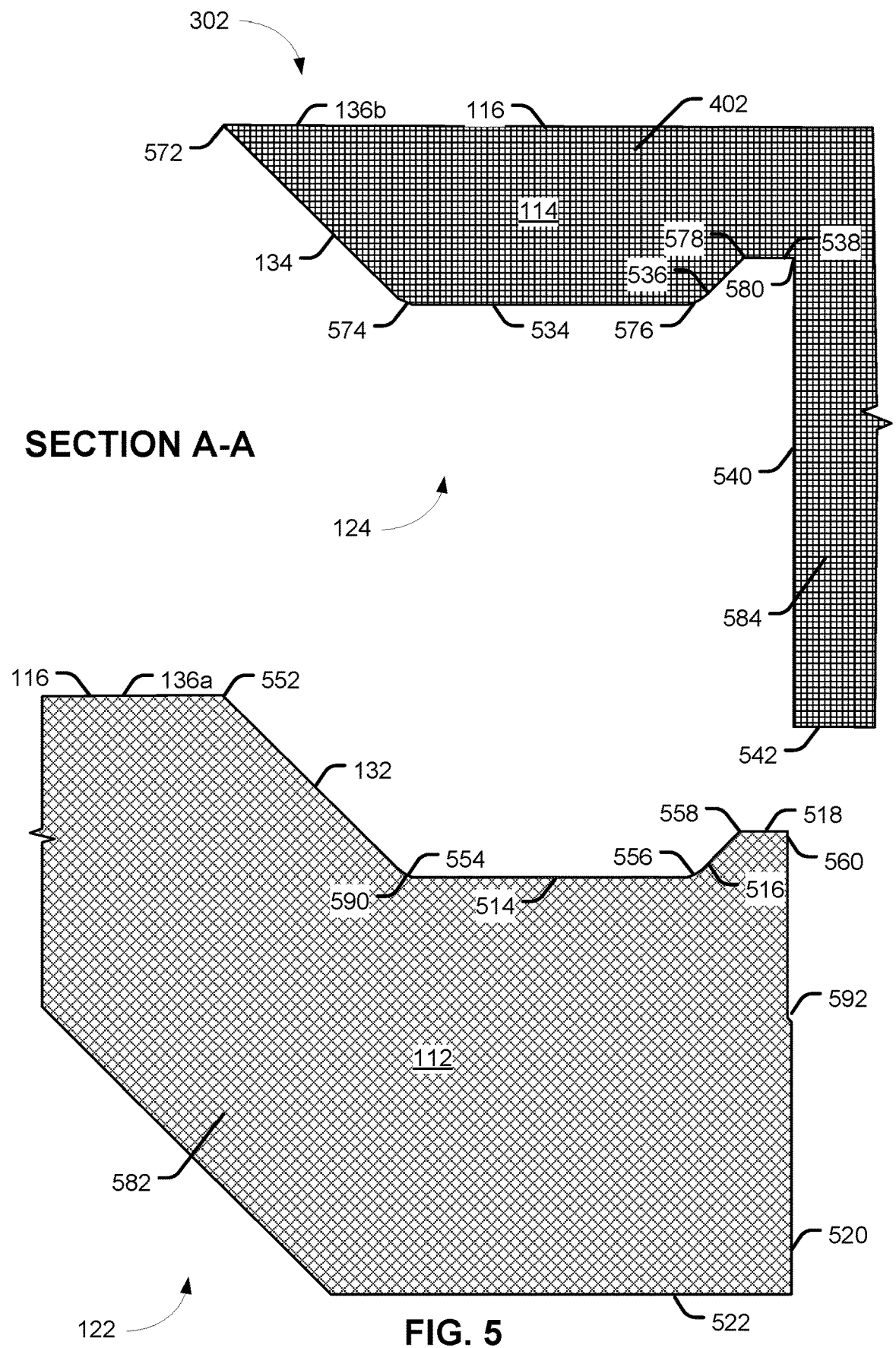
FIG. 5 is a diagram that illustrates an exploded front view of joint portions of the tool assembly of FIG. 2.

As illustrated in FIG. 4, the male joint portions, i.e., the second and third joint portions 124, 422, include tabs 402 (e.g., protrusions) which fit into recesses of the female joint portions, the first and fourth joint portions 122, 424. The surfaces of the joint portions 122, 124, 422, 424 may include angled surfaces (e.g., the interlock surfaces 132, 134, 516, 536 of FIG. 5) as illustrated in FIGS. 4 and 5. The angled surfaces (e.g., the interlock surfaces 132, 134, 516, 536 of FIG. 5) may help the joints 302, 304 accommodate thermal expansion of the pieces 112, 114, 202 better than horizontal or vertical surfaces.

Thermal expansion of a component is based on or governed by a few properties of the component, such as material composition, arrangement (e.g., micro arrangement such as wood grain or fiber arrangement), and size. For linear thermal expansion (e.g., thermal expansion along a particular axis), thermal expansion of a component is dependent on a length of the component in the particular axis and a particular coefficient of thermal expansion along the particular axis, which is dependent based on the material and the arrangement. To illustrate, for the first piece 112, thermal expansion along the longitudinal axis 254 is much greater (e.g., 100 times greater) than thermal expansion along the vertical axis 252 because the length of the first piece 112 in the longitudinal axis 254 is greater than the thickness the first piece 112 in the vertical axis 252 and because the coefficient of the thermal expansion along the longitudinal axis 254 is greater than the coefficient of the thermal expansion along the vertical axis 252. In a particular implementation, the material of the first piece 112 has a 10 times greater coefficient of thermal expansion in the longitudinal axis 254, as compared to the vertical axis 252, because fibers of the material are oriented with the longitudinal axis 254. Thermal expansion along the transverse axis 256 is substantially parallel to an orientation of the joints 302, 304 and thus, thermal expansion along the transverse axis 256 affects the joints 302, 304 to a lesser amount than thermal expansion along the vertical or longitudinal axes 252, 254.

For conventional joints, such a difference in thermal expansion between the axes 252, 254 may cause the layup surface 116 of FIG. 1 to deform. For example, joint portions 122, 124 may deflect along the vertical axis 252 (e.g., upwards as illustrated in FIG. 4) and deform a layup surface. In the implementation illustrated in FIG. 4, the geometry of the tab 402 causes the tab 402 to remain in place or deflect downwards as illustrated in FIG. 4, and thus the layup surface 116 is preserved. Additionally, fasteners or adhesives can be added to cause the tab 402 to remain in place or resist deflection in the vertical axis 252, which preserves the geometry of layup surface 116.

FIG. 5 is a diagram that illustrates an exploded view of joint portions 122, 124 of first and second pieces 112, 114 of the tool assembly 102 of FIG. 2. The exploded view is of cross-sections of the first and second joint portions 122, 124.

The first joint portion 122 of the first piece 112 includes a top surface 136a, intermediate surfaces 514, 518, a vertical edge surface 520, a bottom surface 522, the first interlock surface 132, and a third interlock surface 516. As illustrated in FIG. 5, the top surface 136a of the first piece 112 is also part of the layup surface 116. In some implementations, the vertical edge surface 520 include a notch 592. In some such implementations, a portion of the vertical edge surface 520 contacts the second joint portion 124, such as the portion of the vertical edge surface 520 below the notch 592 as illustrated in FIG. 5.

The top surface 136a and the first interlock surface 132 form an obtuse angle corner 552 (e.g., an obtuse angle edge). The first interlock surface 132 and a first intermediate surface 514 form an obtuse angle corner 554. The first intermediate surface 514 and the third interlock surface 516 form an obtuse angle corner 556. The third interlock surface 516 and the second intermediate surface 518 form another obtuse angle corner 558. The second intermediate surface 518 and the vertical edge surface 520 form a substantially right angle corner 560. The vertical edge surface 520 and the bottom surface 522 form a substantially right angle corner.

The second joint portion 124 of the second piece 114 includes a top surface 136b, intermediate surfaces 534, 538, vertical edge surface 540, a bottom surface 542, the second interlock surface 134, and a fourth interlock surface 536. As illustrated in FIG. 5, the top surface 136b of the second piece 114 is also part of the layup surface 116.

The top surface 136b and the second interlock surface 134 form an obtuse angle corner 572. The second interlock surface 134 and a first intermediate surface 534 form an obtuse angle corner 574. A second intermediate surface 538 and the fourth interlock surface 536 form an obtuse angle corner 576. The fourth interlock surface 536 and the second intermediate surface 538 form an obtuse angle corner 578. The second intermediate surface 538 and the vertical edge surface 540 form a substantially right angle corner 580. The vertical edge surface 520 and the bottom surface 522 form another substantially right angle corner.

In some implementations, the interlock surfaces 132, 134, 516, 536 are oriented at a 45 degree angle relative to the longitudinal axis 254 of FIG. 2. By orienting the interlock surfaces 132, 134, 516, 536 as opposing surfaces at a 45 degree angle or a 135 degree angle, the joint 304 becomes self-locking. These 45 degree or 135 degree angle opposing surfaces help mitigate cracks in a bond (e.g., a bond line) of the joint 304 which occur from the thermal stresses the tool assembly 102 encounters during curing. By mitigating these cracks in the bond line, the tool assembly 102 is able to maintain vacuum integrity (e.g., maintain vacuum pressure applied) during fabrication of the composite part 190 of FIG. 1.

In some implementations, one or more of the interlock surfaces 132, 134, 516, 536, the top surfaces 136a, 136b, the intermediate surfaces 514, 518, 534, 538, or the vertical edge surfaces 520, 540 of the joint portions 122, 124 form filleted (e.g., rounded) or chamfered corners 590. Thus, one of more of the acute angle corner 572, or the obtuse angle corners 552, 554, 556, 574, 576 are filleted or chamfered corners 590. As illustrated in FIG. 5, the obtuse angle corners 554, 556, 574, 576 are filleted (e.g., rounded) corners 590. Such filleted or chamfered corners 590 can reduce localized stress and strain maximums and, therefore, breaking or cracking of the joint portions 122, 124. For example, as compared to sharp angled (e.g., acute corners and/or non-filleted or chamfered corner) or right angled edges and corners, filleted (e.g., rounded) or chamfered corners and edges are less likely to cause localized stress and strain maximums and, therefore, breaking or cracking.

The first and second joint portions 122, 124 further include tangs 582, 584 respectively. The tangs 582, 584 are configured to contact each other to form a joint. For example, the tangs 582, 584 contact each other via the vertical edge surfaces 520, 540 below the notch 592. The tangs 582, 584 form a trapezoidal shape when joined, as illustrated in FIG. 6. In some implementations, the tangs 582, 584 provide a space for fasteners, as described with reference to FIGS. 7 and 8.

Figure 6:
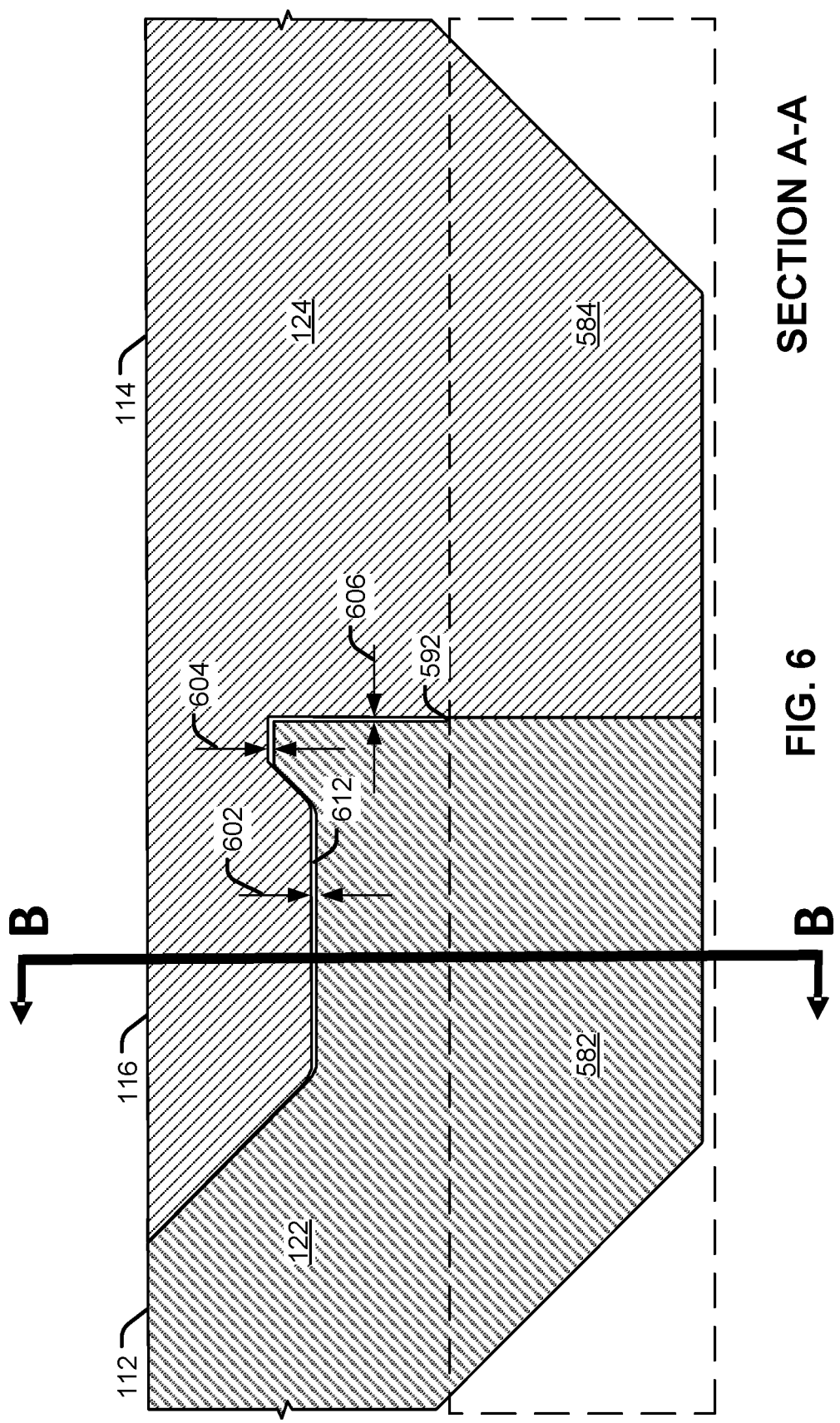
FIG. 6 is a diagram that illustrates a front view of the cross-section of the tool assembly of FIG. 2 depicting a particular joint thereof.

FIG. 6 is a diagram that illustrates a front view of the cross-section of the tool assembly 102 of FIG. 2 depicting joints thereof. FIG. 6 illustrates gaps 602-606 formed by mating the joint portions 122, 124 of the first and second pieces 112, 114. As illustrated in FIG. 6, the interlock surfaces 132, 134 and the interlock surfaces 516, 536 are in contact and are interlocked.

As illustrated in FIG. 6, when the first and second joint portions 122, 124 are joined (e.g., mated), a first gap 602 is formed by (e.g., positioned between and defined by) the surfaces 514, 534 of FIG. 5, a second gap 604 is formed by (e.g., positioned between and defined by) the surfaces 518, 538 of FIG. 5, and a third gap 606 is formed by (e.g., positioned between and defined by) the vertical edge surfaces 520, 540 of FIG. 5. As illustrated in FIG. 6, the third gap 606 ends at the notch 592. The end of the gap 606 and the notch 592 may define an upper portion of the tangs 582, 584, as illustrated in FIG. 6 by a dashed rectangle.

In FIG. 6, the second gap 604 and the third gap 606 are connected. In other implementations or under certain conditions, such as thermal expansion, the second gap 604 and the third gap 606 are not connected. For example, a portion of one or more of the surfaces 518, 520, 538, 540 of FIG. 5 near the corners 560, 576 of FIG. 5 is in contact with a portion of another of the surfaces 518, 520, 538, 540 of FIG. 5. FIG. 6 also depicts a cross-section line B-B passing through the first gap 602.

In some implementations, the joint 302 includes adhesive material 612 configured to form a bond (e.g., a bond line) between surfaces of the joint 302. In a particular implementation, the adhesive material 612 is applied to at least a portion of one of the first or second joint portions 122, 124. For example, the adhesive material 612 is applied to particular portions of the first and second joint portions 122, 124, such as to surfaces of the first and second joint portions 122, 124 corresponding to the gaps 602-606. In such implementations, the gaps 602-606 define bond lines which are areas where the surfaces of the first and second joint portions 122, 124 are bonded by the adhesive material 612. The bond line helps enable the joint 302 to maintain vacuum integrity. For example, the gaps 602-606 in the joint 302 provide space for the adhesive material 612 and inhibit movement of the adhesive material 612 to maintain the vacuum integrity of the joint 302. Additionally, the gaps 602-606 provide space for thermal expansion of the material of the tool assembly 102.

The adhesive materials 612 may include thermoset polyimides, benzoxazine resins, bis-maleimides, thermoset polyurethanes, epoxies, phenolics, or vinyl esters. The adhesive material 612 may include or correspond to an adhesive paste or an adhesive film. An adhesive film may have a higher heat resistance (e.g., capable of withstanding high temperatures without deforming or reducing adhesion strength) as compared to adhesive pastes, but may be harder to assemble.

Figure 7:
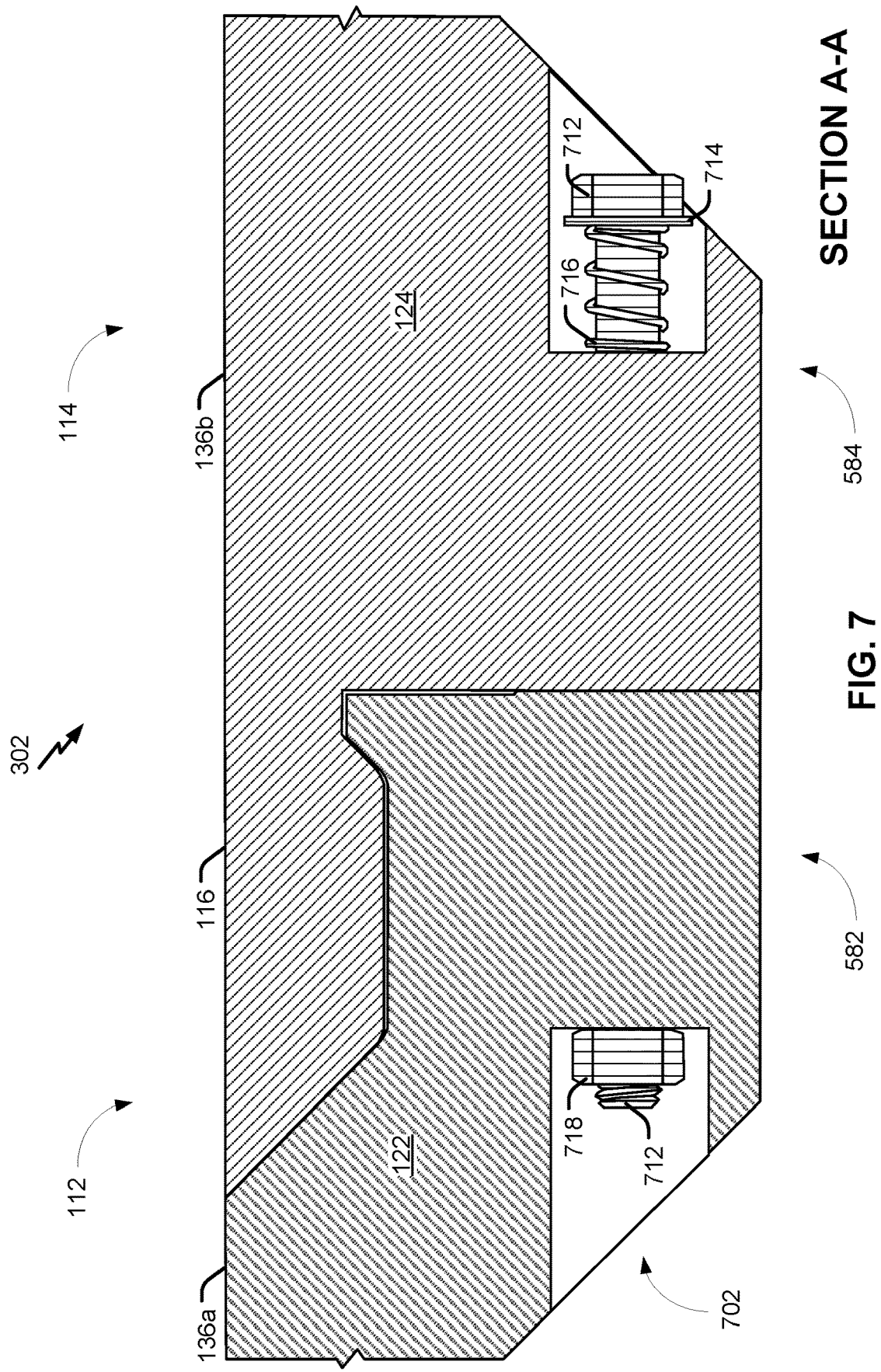
FIG. 7 is a diagram that illustrates a cross-section of another example of a tool assembly including a fastener.

FIG. 7 is a diagram that illustrates a cross-section of another example of a tool assembly 102 including a first example of the fastener 118 of FIG. 1. More specifically, the first example of the fastener 118 is a fastener assembly 702. As illustrated in FIG. 7, the fastener assembly 702 includes a bolt 712, a washer 714, a spring 716, and a nut 718. In other implementations, the spring 716 may be replaced by other biasing members, such as a spring washer, a Belleview washer, etc.

The fastener assembly 702 is positioned at least partially in a clearance hole (not shown) that passes through the tangs 582, 584 of the first and second joint portions 122, 124. As illustrated in FIG. 7, the fastener assembly 702 is oriented substantially parallel to the layup surface 116 and the top surfaces 136a, 136b of the first and second pieces 112, 114. In FIG. 7, the fastener assembly 702 is positioned at least partially in a counter bore hole (e.g., recess). As illustrated in FIG. 7, the fastener assembly 702 extends through the tangs 582, 584 of the first and second joint portions 122, 124. In some implementations, multiple fastener assemblies 702 are placed through the tangs 582, 584 of FIG. 5 along the transverse axis 256 of FIG. 2 to join the first and second pieces 112, 114.

When in a high temperature environment, such as when curing composite parts, or upon heating, the spring 716 enables the fastener assembly 702 to maintain a retention force joining the first and second pieces 112, 114 while allowing for thermal expansion of the first and second pieces 112, 114. Specifically, the spring 716 can deform (e.g., extend and compress) such that the fastener assembly 702 provides the retention force at varying lengths or stages of thermal expansion. Additionally, the fastener assembly 702 is configured to relieve stress and strain on the tool assembly 102 when the tool assembly 102 is moved or handled. Furthermore, the fastener assembly 702 helps maintain the vacuum integrity of the tool assembly 102.

FIG. 8 is a diagram that illustrates a cross-section of the tool assembly 102 of FIG. 6 including a second example of the fastener 118 of FIG. 1. More specifically, the second example of the fastener 118 is a second fastener assembly 802. As illustrated in FIG. 8, the second fastener assembly 802 includes a screw 812, the washer 714, and the spring 716. In other implementations, the second fastener assembly 802 includes a different biasing member in place of the spring 706. Alternatively, the second fastener assembly 802 includes or corresponds to a blind fastener. In such implementations, the second piece 114 include a threaded section or a blind nut.

The second fastener assembly 802 is configured to join the first and second pieces 112, 114. As illustrated in FIG. 8, the first piece 112 include a counter bore hole 804, and the second fastener assembly 802 is inserted into the counter bore hole 804. A shank of the screw 812 passes through a clearance hole 806 of the first piece 112 where threads 822 of the screw 812 do not engage with (i.e., contact) the first piece 112. The threads 822 of a distal end of the screw 812 opposite the washer 714 and a screw head engage (i.e., contact) the second piece 114 in a pilot hole 808 thereof. Although the screw 812 is illustrated as fully threaded in FIG. 8, in other implementations, a portion of the shank of the screw 812 is unthreaded (e.g., a partially threaded screw 812 or shank). In other implementations, the first piece 112 includes a counter sink hole or a recess in the alternative to the counter bore hole 804.

Because the screw 812 of the second fastener assembly 802 drives into the second piece 114 (e.g., the top piece of the joint 302), the second fastener assembly 802 secures (e.g., pulls) the pieces 112, 114 together, which stabilizes the joint 302. Because the threads 822 of the screw 812 pass through the clearance hole 806 of the first piece 112, the second fastener assembly 802 enables the material of the tool assembly 102 to expand in a high temperature environment (e.g., enables the first piece 112, the second piece 114, and/or the gap 602 to expand and contract). The spring 716 enables thermal expansion of the tool assembly 102 and can inhibit transferring stress and strain causes by thermal expansion of the tool assembly 102 into the screw 812 itself. The second fastener assembly 802 helps maintain the vacuum integrity of the tool assembly 102. In some implementations, multiple second fastener assemblies 802 are placed along a centerline of the joint 302 (e.g., along the transverse axis 256 of FIG. 2 between the first and second pieces 112, 114).

Figure 9B:
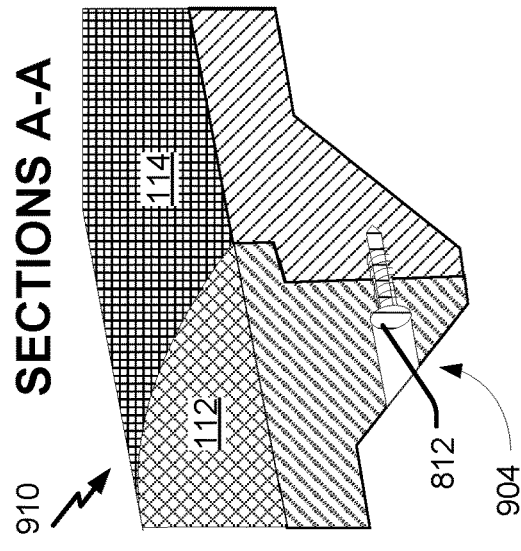
Figure 9C:
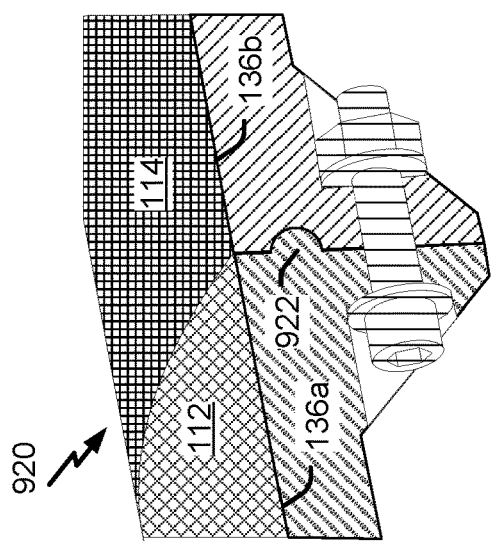
Figure 9D:
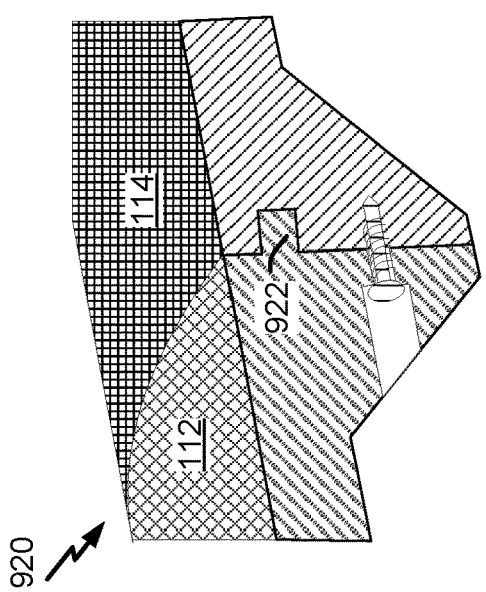
Figure 9E:
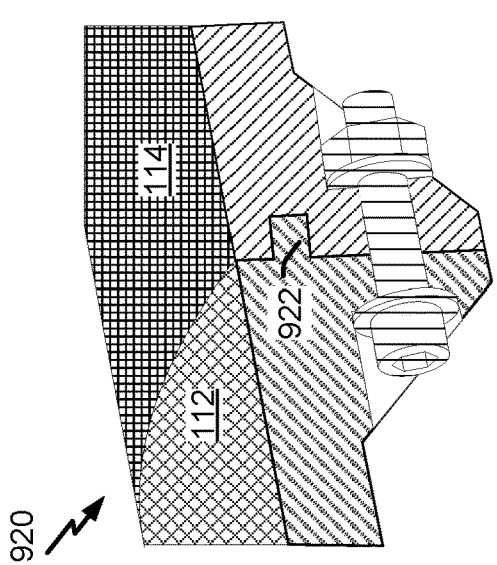
Figure 9F:
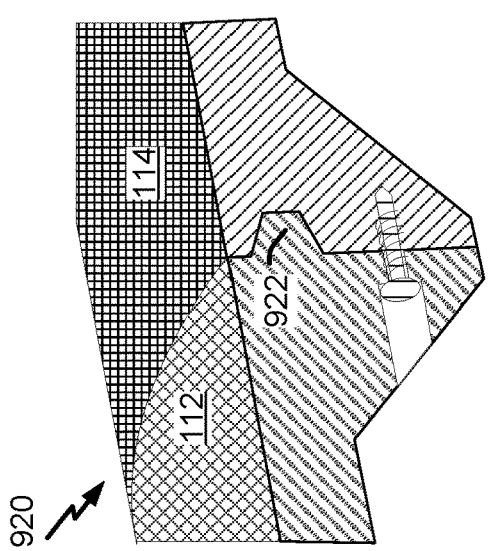
Figure 9G:
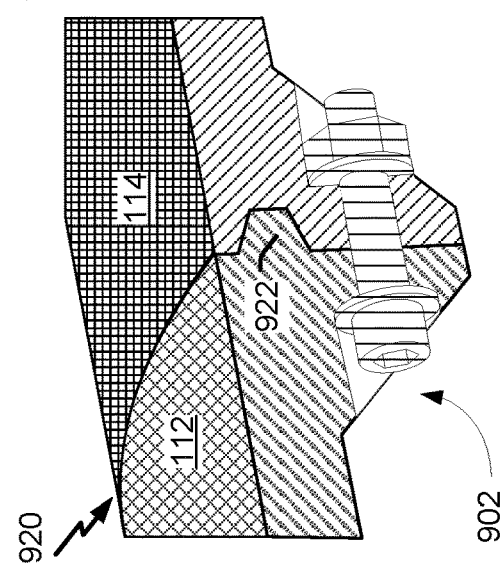

FIG. 9A-9O are each a diagram that illustrates an example of joint portions of other joints for tool assemblies 102. FIGS. 9A-9O illustrate cross-section views of the joints. FIGS. 9A and 9B illustrate examples of a lap joint (e.g., a half lap splice joint). FIG. 9A illustrates an example cross-section of a half lap splice joint 910 including a third example of the fastener 118 of FIG. 1, i.e., a third fastener assembly 902. As illustrated in FIG. 9A, the third fastener assembly 902 includes a bolt 712, two washers 714, and a nut 718. FIG. 9B illustrates another example cross-section of a half lap splice joint 910 including a fourth example of the fastener 118 of FIG. 1, i.e., a fourth fastener 904. As illustrated in FIG. 9B, the fourth fastener 904 includes or corresponds to a screw, such as the screw 812 of FIG. 8.

FIGS. 9C-9G illustrate examples of a tongue and groove joint 920. As compared the lap joints 910 of FIGS. 9A and 9B, the tongue and groove joints 920 of FIGS. 9C-9G have inserts or tongues 922 that are positioned between the layup surface 116 of FIG. 1 and top surfaces 136a, 136b of FIG. 5 or bottom surfaces 522, 542 of FIG. 5 of the joint portions 122, 124. As illustrated in FIGS. 9C-9G, the tongues 922 are positioned below or beneath the layup surface 116 of FIG. 1 and the top surfaces 136a, 136b of the first and second pieces in the vertical axis 252 of FIG. 2.

FIGS. 9H-9K illustrate examples of scarf joints 930 (e.g., nibbed scarf joints). The scarf joints 930 of FIGS. 9H-9K include the interlock surfaces 132, 134 and a nib 934 (e.g., a blunt portion or feature that engages a matching shoulder in the mating piece). The interlock surfaces 132, 134 are angled relative to the top surfaces 136a, 136b.

Figure 9H:
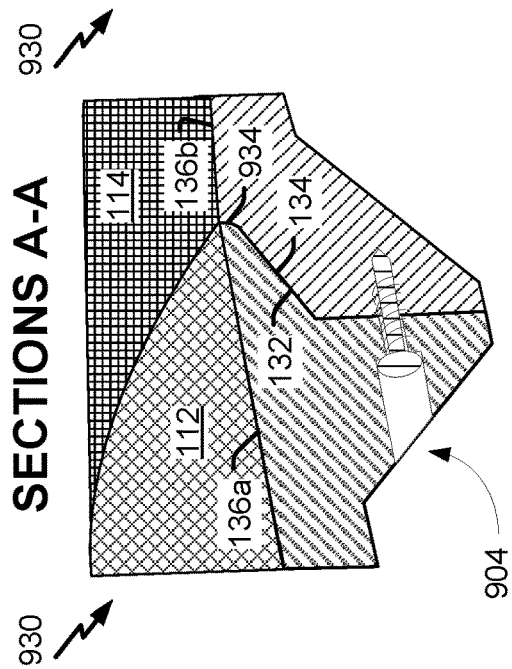
Figure 9I:
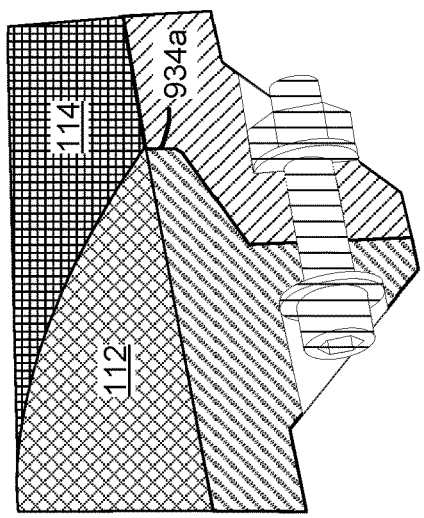
Figure 9J:
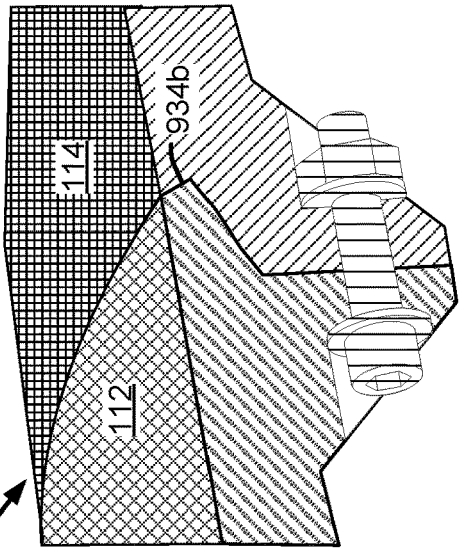
Figure 9K:
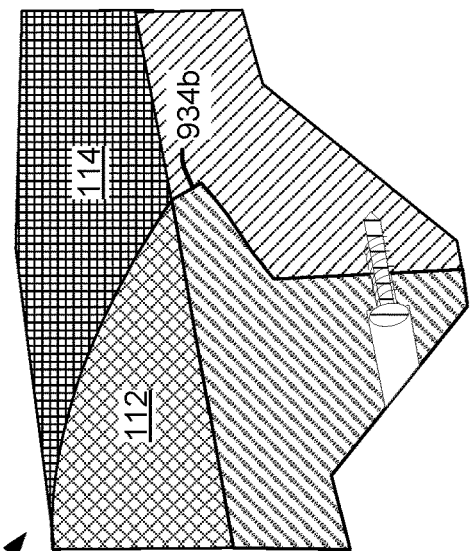

FIGS. 9I and 9J illustrate examples of a nibbed scarf joint 930 with the third fastener assembly 902. As compared to the nib 934 of FIG. 9H, the nib 934a of FIG. 9I is larger or deeper in the vertical axis 252 of FIG. 2. FIGS. 9H and 9K illustrate examples of nibbed scarf joints 930 with the fourth fastener 904. As compared to the nibs 934, 934a of FIGS. 9H and 9I which have substantially vertical surfaces, the nibs 934b corresponding to the top surfaces 136a, 136b of FIGS. 9J and 9K (e.g., upper nibs 934b as illustrated in FIGS. 9J and 9K) have angled surfaces 936 and form an obtuse angled corner 937 or outside edge 938 with the angled surface 936.

Figure 9L:
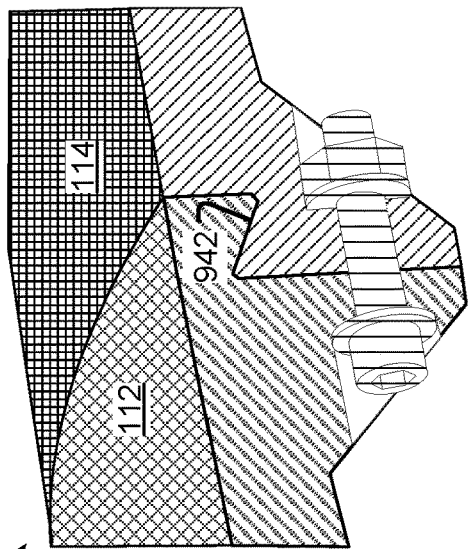

FIG. 9L illustrates an example of a beveled lap joint 940 (e.g., a beveled lap splice joint). As compared to the half lap splice joint 910 of FIGS. 9A and 9B, the beveled lap splice joint 940 has an angled intermediate surface 942. The angled intermediate surface 942 includes a pair of complementary intermediate surfaces that are positioned at an angle relative to the layup surface 116.

FIG. 9M illustrates an example of a combination joint 950 (e.g., a beveled lap and scarf joint). The combination joint 950 includes a scarf joint 930 where the nib 934 is a beveled lap joint 940. As illustrated in FIG. 9M, the scarf joint 930 starts from one end of a beveled lap joint 940. As compared the beveled lap joint 940 of FIG. 9L, the combination joint 950 of FIG. 9M includes an angled scarf portion 952, which includes the interlock surfaces 132, 134. As illustrated in FIG. 9M, the combination joint 950 includes the fourth fastener 904 inserted into the counter bore hole 804 of the second joint portion 124 of the second piece 114. In some implementations, the second joint portion 124 includes the clearance hole 806 and the threads 822 of the third fastener assembly 902 do not contact the second joint portion 124 in the clearance hole 806. As illustrated in FIG. 9M, the fourth fastener 904 is oriented at an angle relative to the layup surface 116 and the top surfaces 136a, 136b of the first and second pieces 112, 114. The fourth fastener 904 is oriented substantially orthogonal to the angled scarf portion 952 and passes through tangs 582, 584 of the first and second joint portions 122, 124.

FIG. 9N illustrates an example of an angled tabled splice joint 960 (a.k.a., a hooked scarf joint). As illustrated in FIG. 9N, the angled tabled splice joint 960 includes the fourth fastener 904 inserted into the counter bore hole 804 of the first joint portion 122. In some implementations, the first joint portion 122 includes the clearance hole 806 and the threads 822 of the screw 812 do not contact the first joint portion 122 in the clearance hole 806.

As illustrated in FIG. 9N, the fourth fastener 904 and the counter bore hole 804 are oriented substantially orthogonal to the angled intermediate surface 944 and are angled relative to the layup surface 116 of FIG. 1 and to the top surfaces 136a, 136b of the first and second pieces 112, 114. Additionally or alternatively, the fourth fastener 904 and/or one or more additional fasteners, such as one of the fasteners 118, 904 or one of the fastener assemblies 702, 802, 902 may be arranged along the vertical axis 252 of FIG. 2 and substantially orthogonal to the layup surface 116 of FIG. 1 and the top surfaces 136a, 136b of the first and second pieces 112, 114. As compared to the joint 302 of FIGS. 5 and 6, which has the interlock surfaces 132, 134, 516, 536 positioned at an angle relative to the layup surface 116 and the intermediate surfaces 514, 534 that are substantially parallel to the layup surface 116, the angled tabled splice joint 960 of FIG. 9N includes vertical interlock surfaces 962, 964 and the angled intermediate surfaces 942, 944. The vertical interlock surfaces 962, 964 each include a pair of complementary interlock surfaces (e.g., such as the interlock surfaces 132, 134) that are substantially orthogonal to the layup surface 116.

FIG. 9O illustrates an example of an angled tabled splice joint 960 with the interlock surfaces 132, 134, 516, 536 positioned at an angle relative to the layup surface 116. As illustrated in FIG. 9O, the first joint portion 122 of the angled tabled splice joint 960 includes the counter bore hole 804 and the clearance hole 806, and the second joint portion 124 includes the pilot hole 808 for receiving a fastener, such as the fourth fastener 904. Alternatively, the pilot hole 808 can be replaced with or configured to receive a threaded portion (e.g., a blind nut) of a blind fastener such that that first and second joint portions 122, 124 can be joined with the blind fastener. As illustrated in FIG. 9O, the holes 804-806 are arranged along the vertical axis 252 of FIG. 2 and substantially orthogonal to the layup surface 116 of FIG. 1 and the top surfaces 136a, 136b of the first and second pieces 112, 114. Additionally or alternatively, a fastener, such as one of the fasteners 118, 904 or one of the fastener assemblies 702, 802, 902 may be oriented substantially orthogonal to a second angled intermediate surface 944 and angled relative to the layup surface 116 of FIG. 1 and the top surfaces 136a, 136b of the first and second pieces 112, 114. As compared to the joint 302 of FIGS. 5 and 6, the angled tabled splice joint 960 of FIG. 9O includes the angled intermediate surfaces 942, 944.

In some implementations, the angled tabled splice joint 960 includes gaps 602-606, as illustrated in FIG. 9O. The gaps 602-606 may be configured to receive adhesive materials 612, keys, or wedges. For example, the gaps 604, 606 may include key holes and be configured to receive a key or wedge. Insertion of the key or wedge tightens the angled tabled splice joint 960.

FIGS. 9A-9N are depicted with a particular type of fastener, such as one of the third fastener assemblies 902 or the fourth fasteners 904. In other implementations, other types of fasteners may be used with the examples depicted in FIGS. 9A-9O, such as one or more of the fasteners 118, 904 or one or more of the fastener assemblies 702, 802, 902. In some implementations, the joints 910-960 of FIGS. 9A-9O include or more additional fasteners. For example, the example joints may include multiple fasteners of the some type as illustrated and/or one or more additional fasteners of another type. Additionally or alternatively, the joints 910-960 of FIGS. 9A-9O further include the adhesive material 612 of FIG. 6. In some implementations, the corners or edges of the joints of FIGS. 9A-9O are filleted corners or chamfered corners.

Figure 10:
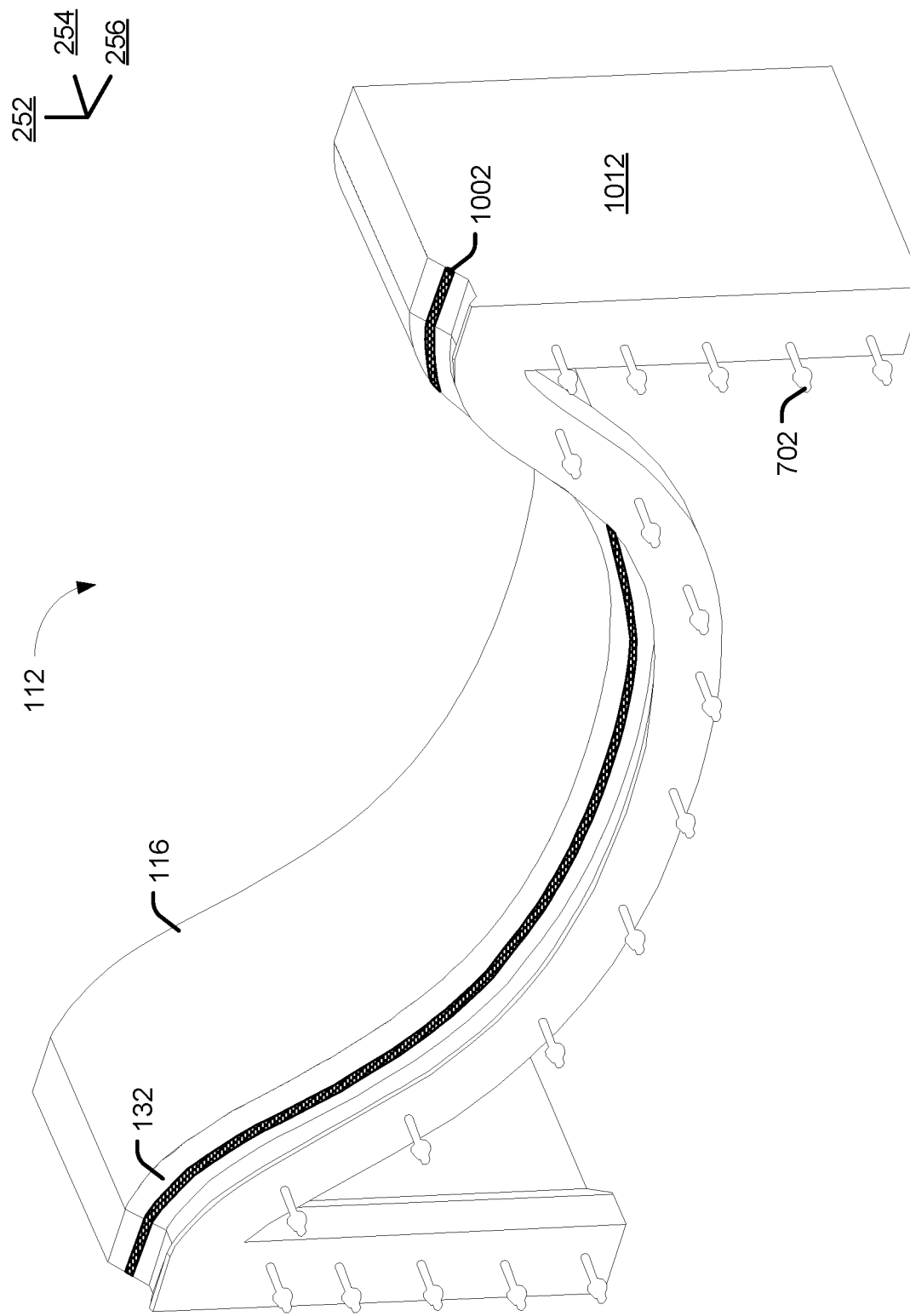
FIG. 10 is a diagram that illustrates an example of a piece of a tool assembly including an O-ring.

FIG. 10 is a diagram that illustrates an example of a piece, such as the first piece 112, of the tool assembly 102 including an annular ring seal 1002 (e.g., a tubular seal or an O-ring seal). In some examples, the annular ring seal 1002 is cylindrical with an inlet and an opposing outlet. The annular ring seal 1002 is positioned between the first interlock surface 132 and the second interlock surface 134 (not shown in FIG. 10). The annular ring seal 1002 is configured to create or maintain an air-tight seal between the interlock surfaces 132, 134. For example, joining of the first and second pieces 112, 114 (e.g., joint portions 122, 124 thereof) compresses the annular ring seal 1002 and creates or maintains the vacuum sealing. As illustrated in FIG. 10, the annular ring seal 1002 is positioned in the middle of the first interlock surface 132 and extends along the first interlock surface 132 in the transverse axis 256. In other implementations, the annular ring seal 1002 may be placed on the first interlock surface 132 closer to or further from the top of the tool assembly 102 (e.g., the layup surface 116).

In some implementations, one or both of the interlock surfaces 132, 134 include a recess to accommodate the annular ring seal 1002. The recess is configured to enable insertion or placement of the annular ring seal 1002 when the tool assembly 102 is disassembled and retention of the annular ring seal 1002 when the tool assembly 102 is assembled.

In some implementations, the annular ring seal 1002 is used in the alternative to the adhesive material 612 of FIG. 6. For example, when the tool assembly 102 is not exposed to significant handling (e.g., handling conditions that cause loads which create deflections which are greater than the adhesive material 612 or an adhesive bond formed therefrom can withstand).

In other implementations, the annular ring seal 1002 is used in conjunction with the adhesive material 612 of FIG. 6. For example, the annular ring seal 1002 provides additional sealing or backup sealing such that cracks in the adhesive bond formed by the adhesive material 612 do not lead to leaks or loss of vacuum integrity. Such cracks in the adhesive bond may occur in large tools from handling or exposure to repeated curing processes.

FIG. 10 illustrates a plurality of fastener assemblies 702 to couple the first piece 112 to the second piece 114. Although the example of the tool assembly 102 illustrated in FIG. 10 does not illustrate fasteners extending through the first and second pieces 112, 114 in the vertical axis 252, such as the second fastener assembly 802 of FIG. 8, in other implementations the tool assembly 102 includes one or more fasteners extending through the first and second pieces 112, 114 in the vertical axis 252, as described with reference to FIG. 8. Additionally, the pieces 112, 114, 202 of the tool assembly 102 of FIG. 10 may have joint portions (e.g., the joint portions 122, 124) that extend along only a portion of a width of the tool assembly 102 in the transverse axis 256, as illustrated in FIG. 2.

Figure 11:
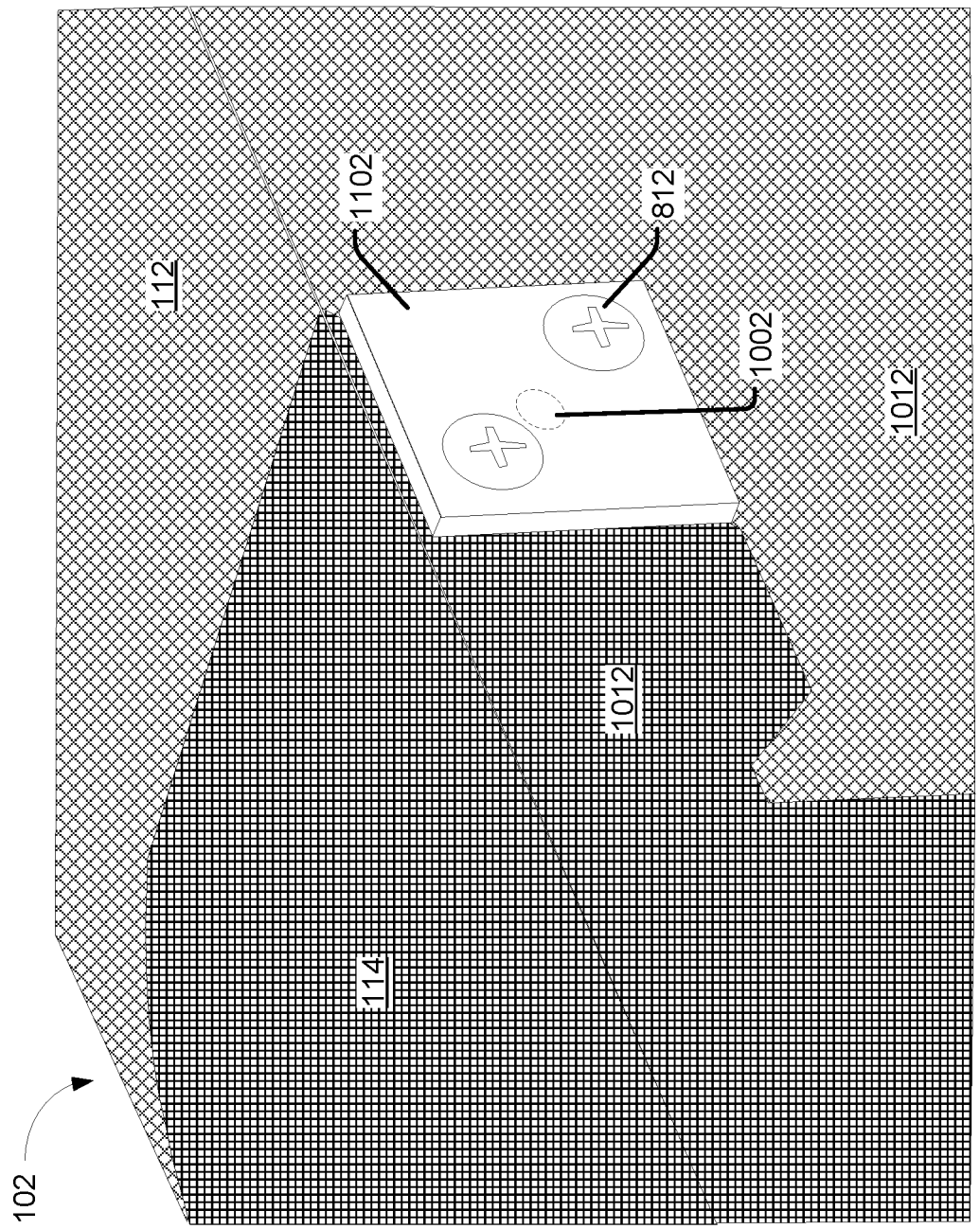
FIG. 11 is a diagram that illustrates an example of a tool assembly including an O-ring and a support plate.

FIG. 11 is a diagram that illustrates an example of a tool assembly 102 including the annular ring seal 1002 (e.g., a tubular seal or O-ring seal) and a support plate 1102. The support plate 1102 is configured to secure two adjoining pieces (e.g., the first and second pieces 112, 114) and is fastened to a side surface 1012 using one or more fasteners, such as the fastener 118 of FIG. 1. As illustrated in FIG. 11, the support plate 1102 is coupled to the tool assembly 102 using two screws 812, one for each piece 112, 114. In some implementations, as shown in FIG. 11, the support plate 1102 covers or protects the annular ring seal 1002. To illustrate, the support plate 1102 covers and protects an inlet, an outlet, both, (i.e., "ends") of the annular ring seal 1002. In such implementations, the support plate 1102 creates or maintains the vacuum seal in conjunction with the annular ring seal 1002. In a particular implementation, the annular ring seal 1002 extends past the side surface 1012 of the tool assembly 102 such that fastening the support plate 1102 to the pieces 112, 114 compresses the annular ring seal 1002 and creates or maintains the vacuum sealing.

Figure 12:
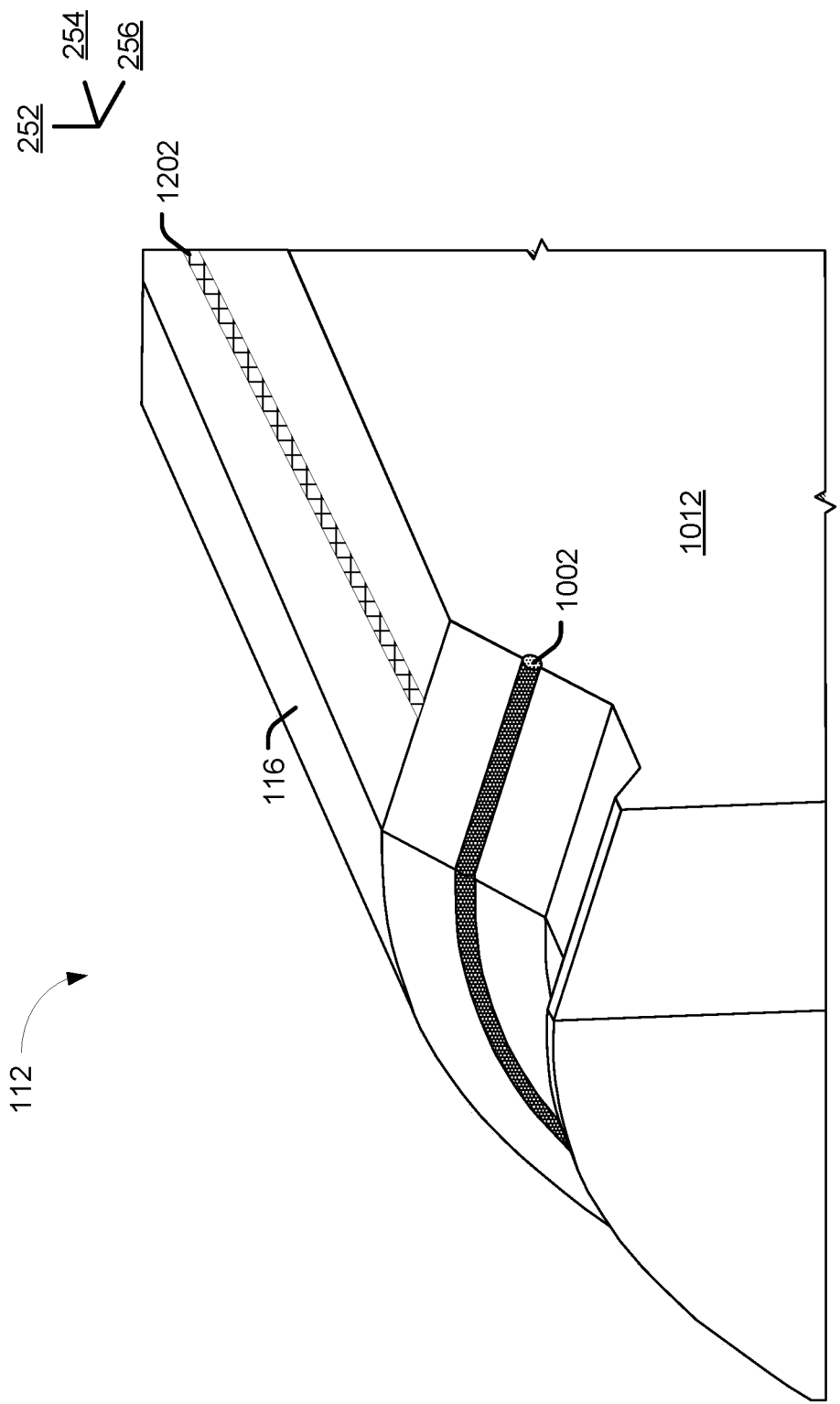
FIG. 12 is a diagram that illustrates a particular example of a piece of a tool assembly including an O-ring and tape.

FIG. 12 is a diagram that illustrates a particular example of a piece of a tool assembly 102 including the annular ring seal 1002 and tape 1202. In the example illustrated in FIG. 12, the annular ring seal 1002 extends in the transverse axis 256 to the side surface 1012 of the first piece 112.

The tape 1202 (e.g., bag tape) is configured to secure a vacuum bag to the tool assembly 102 during curing and create a seal between the tool assembly 102 and the vacuum bag. The vacuum bag (not shown) is wrapped around the tool assembly 102 and includes a port from which air is removed to generate the vacuum pressure.

Figure 13:
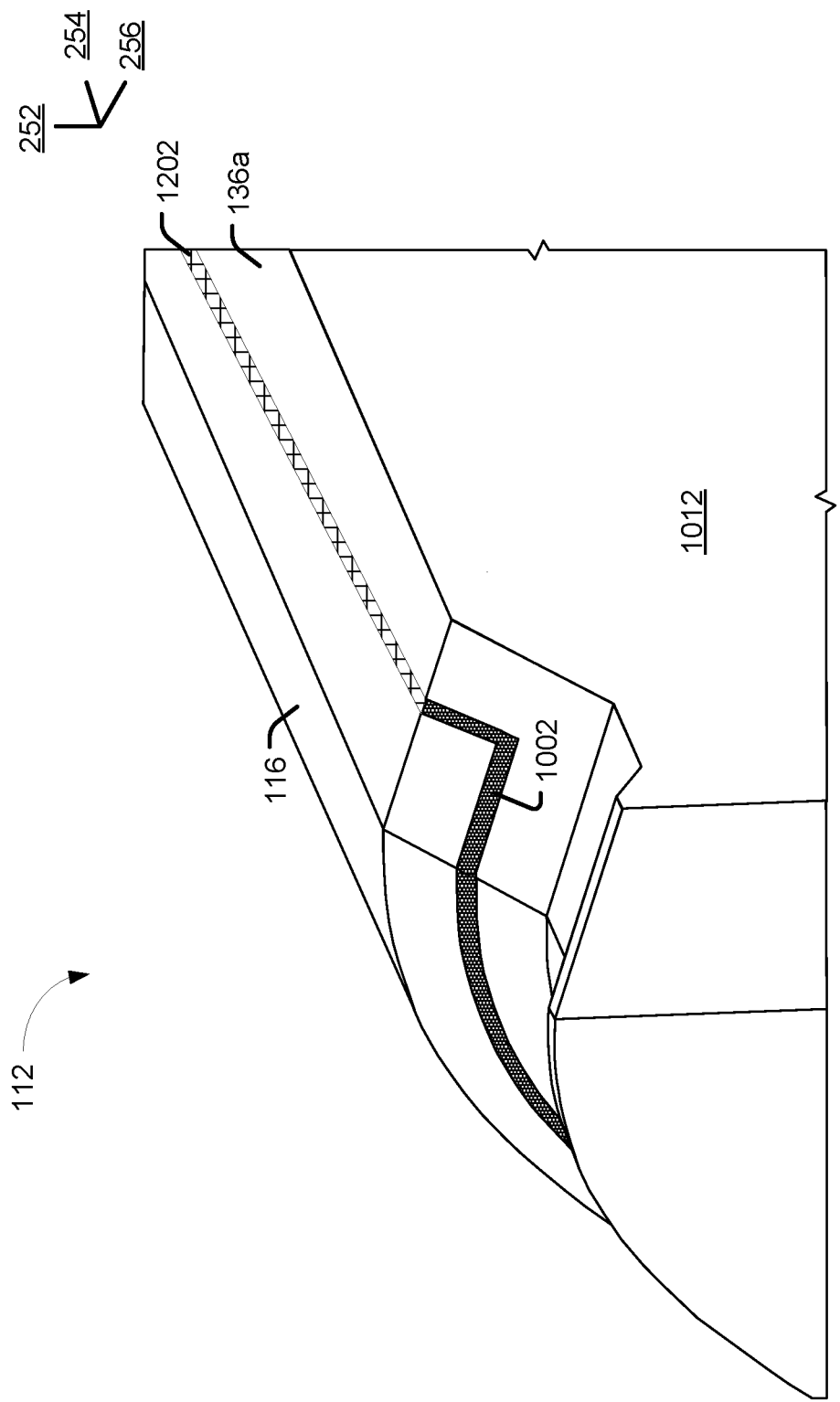
FIG. 13 is a diagram that illustrates another example of a piece of a tool assembly including an O-ring and tape.

FIG. 13 is a diagram that illustrates another example of a piece, such as the first piece 112, of a tool assembly 102 including the annular ring seal 1002 and the tape 1202. In the example illustrated in FIG. 12, the annular ring seal 1002 extends to the top surface 136a (e.g., the layup surface 116) of the first piece 112 underneath the tape 1202 (e.g., between the tape 1202 and the top surface 136a). For example, the inlet or the outlet of the annular ring seal 1002 is positioned toward the top surface 136a. In the implementation illustrated in FIG. 13, the annular ring seal 1002 extends in the vertical and longitudinal axes 252, 254 near the side surface 1012. In other implementations, the annular ring seal 1002 extends to the top surface 136a without extending in the longitudinal axis 254. For example, in tool assemblies 102 where the joint portions do not extend the entire width of the tool assembly 102 along the transverse axis 256, as illustrated in FIG. 2, the annular ring seal 1002 curves upwards in the vertical and transverse axes 252, 256 towards the ends of the tool assembly 102. As another example, the annular ring seal 1002 has a 90 degree curve and extends upwards in the vertical axis 252 near the ends of the tool assembly 102.

As compared to the configuration illustrated in FIG. 12, the configuration illustrated in FIG. 13 reduces vacuum losses from an area between the tape 1202 and the annular ring seal 1002. Alternatively, the configuration in FIG. 1222 reduces vacuum losses from the edges of the annular ring seal (e.g., reduces vacuum leaks near the ends the annular ring seal 1002).

In some implementations, the tool assembly 102 of FIGS. 12 and 13 further includes a support plate, such as the support plate 1102 of FIG. 11. In a particular implementation, the support plate 1102 is coupled to the side surface 1012, and the annular ring seal 1002 extends to the top surface 136a and the tape 1202 (i.e., does not extend to the support plate 1102). In another particular implementation, the support plate 1102 is coupled to the top surface 136*a*, and the annular ring seal 1002 extends to the support plate 1102.

Figure 14:
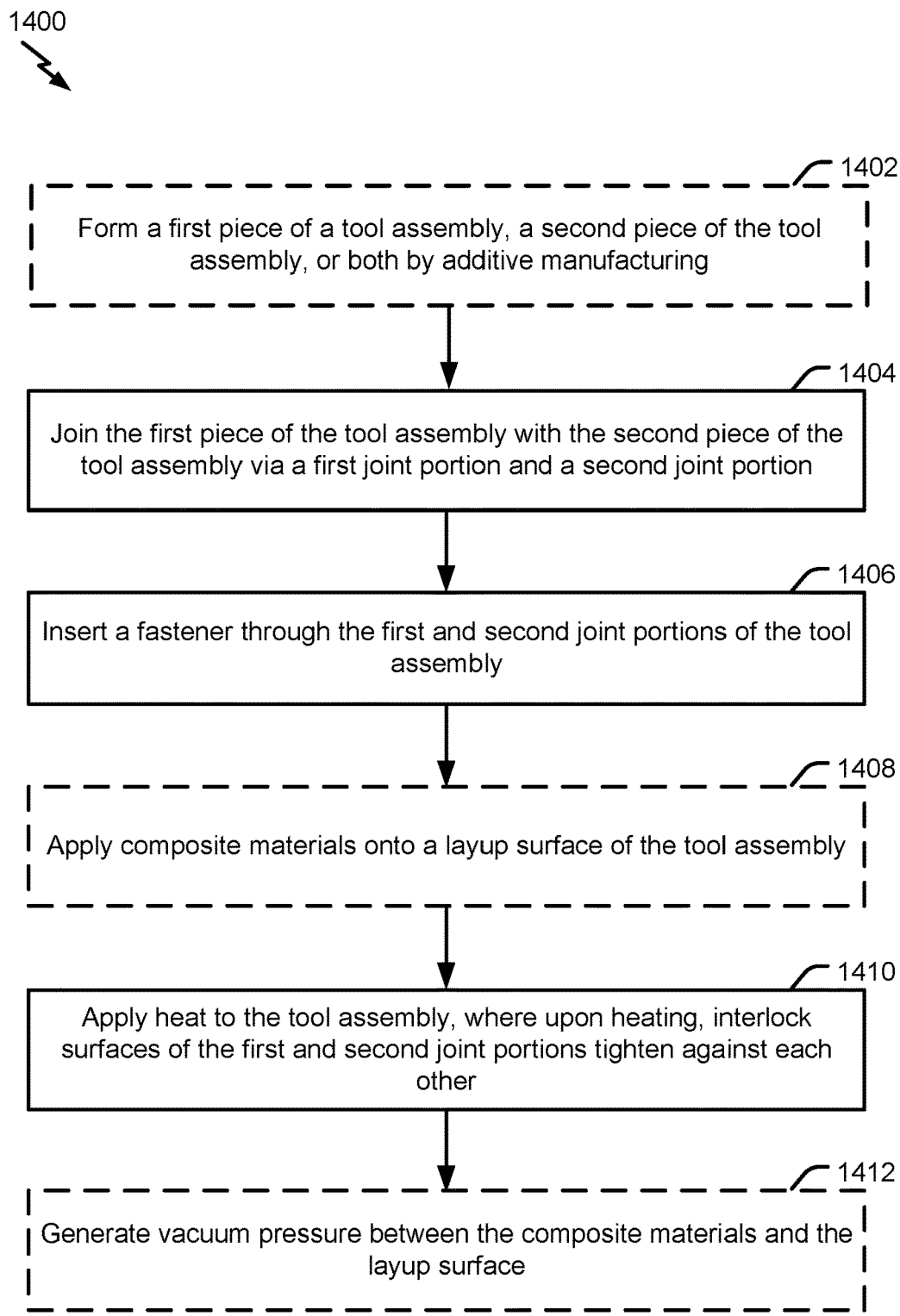
FIG. 14 is a flow chart of an example of a method of heating a tool assembly.

FIG. 14 illustrates a particular example of a method 1400 of heating a tool assembly, such as the tool assembly 102. The method 1400 may be performed by the composite part manufacturing system 100, the layup device, 104, the curing device 108 of FIG. 1, or a combination thereof, as illustrative, non-limiting examples. The tool assembly 102 may include one or more joints as described with reference to FIGS. 3-8 and 9A-9O. In FIG. 14, optional steps of the method 1400 are illustrated as dashed boxes.

In some implementations, the method 1400 includes, at 1402, forming a first piece of a tool assembly, a second piece of the tool assembly, or both by additive manufacturing. For example, the tool assembly may include or correspond to the tool assembly 102 of FIG. 1. The first and second pieces may each include or correspond to the first piece 112, the second piece 114 of FIG. 1, or the third piece 202 of FIG. 2. To illustrate, the first piece 112, the second piece 114, or the third piece 202 of the tool assembly 102 may be formed or fabricated by an additive manufacturing process, as described with reference to FIG. 1. Exemplary additive manufacturing process include fused filament fabrication, such as fused deposition modeling, plastic jet printing, 3-D printing, powder bed processing, selective heat sintering, stereolithography, selective laser melting, selective laser sintering, and the like.

The method 1400 includes, at 1404, joining a first piece of the tool assembly with a second piece of the tool assembly via a first joint portion and a second joint portion. The first and second joint portions may each include or correspond to the first joint portion 122 or the second joint portion 124 of FIG. 1. The first and second joint portions 122, 124 may be joined 1404 by hand or by machinery. As another example, the joint portions may corresponds to joint portions of FIGS. 3-8 and 9A-9O.

The method 1400 includes, at 1406, inserting a fastener through the first and second joint portions of the tool assembly. For example, the fastener may include or correspond to the fastener 118 of FIG. 1, the fastener assembly 702 of FIG. 7, the second fastener assembly 802 of FIG. 8, the third fastener assembly 902 of FIG. 9, or the fourth fastener 904 of FIG. 9. Inserting the fastener 118, 904 or the fastener assemblies 702, 802, 902 through the first and second joint portions 122, 124 can secure the first and second joint portions 122, 124 together such that first and second pieces 112, 114 may be moved as a single tool assembly 102, to form the layup surface 116, or both. Additionally, the first and second joint portions may be joined 1404 by hand or by machinery and may be secured, or further secured, by inserting 1406 additional fasteners of a same or different type, applying adhesive material 612, or both, as described with reference to FIG. 1.

In some implementations, the method 1400 further includes, at 1408, applying composite material onto a layup surface of the tool assembly. The layup surface is configured to support formation of a composite part and has a shape that is complementary to a shape of the composite part. For example, the layup device 104 applies 1408 the composite material 142 onto the layup surface 116 of the tool assembly 102 responsive to receiving commands from the controller 110, as described with reference to FIG. 1. To illustrate, the composite material 142 may be applied 1408 onto the layup surface 116 using any suitable method for positioning the composite material 142 on the tool assembly 102. For example, the composite material 142 can be applied 1408 by: (a) hand layup which includes manually placing the composite material 142 on the layup surface 116 by an individual, (b) robotically placed (e.g., pick-n-place) using a robot having a vacuum assist end effector as the layup device 104 to place the composite material 142 on to the layup surface 116, (c) via Automated Fiber Placement (AFP) in which a machine, acting as the layup device 104, places the composite material 142 on the layup surface 116, especially for composite materials having a width within a range of predetermined widths, (d) via Automated Tap Laying (ATL) which is similar to AFP but used when the composite material 142 is a tape material, or (e) any combination of two or more of the (a)-(d).

The method 1400 further includes, at 1410, applying heat to the tool assembly, where upon heating, interlock surfaces of the first and second joint portions tighten against each other. For example, the curing device 108 applies 1410 heat to the tool assembly 102 to further contact each other or interlock to tighten the interlock surfaces 132, 134 against each other, as described with reference to FIG. 1. Preferably, the composite material 142 is applied 1408 onto the layup surface 116 prior to applying 1410 the heat to the tool assembly 102. The tool assembly 102 in the heated condition maintains vacuum integrity and can be used to cure large composite parts, such as the composite part 190, as described with reference to FIG. 1. In a particular implementation, upon or after applying 1410 the heat, the tool assembly 102 expands longitudinally in the longitudinal axis 254 of FIG. 2 and the tab 402 deflects in the vertical axis 252 towards the bottom surface 522 (e.g., downwards).

In some implementations, the method 1400 includes, at 1412, generating vacuum pressure between the composite material and the layup surface. For example, the vacuum system 106 generates vacuum pressure or vacuum conditions between the composite material 142 and the layup surface 116 of the tool assembly 102 responsive to receiving commands from the controller 110, as described with reference to FIG. 1. As illustrated in FIG. 14, vacuum pressure is generated 1412 after the heat is applied at 1410. In other implementations, vacuum pressure is generated 1412 prior to the heat being applied to tool assembly at 1410 or at least partially concurrently with the heat being applied to tool assembly at 1410.

In some implementations, the fastener 118 inserted at 1406 includes or corresponds to a fastener device. The fastener device extends through tangs of the first and second joint portions, and the fastener device is configured to enable the tool assembly 102 to undergo thermal expansion and still maintain vacuum integrity. For example, the fastener device includes or corresponds to fastener assembly 702 of FIG. 7 or the second fastener assembly 802 of FIG. 8. To illustrate, the fastener assembly 702 extends through the tangs 582, 584 of FIG. 5 along the longitudinal axis 254 of FIG. 2, as described with reference to FIG. 7. In a particular implementation, the fastener 118 is substantially parallel to the layup surface 116 for longitudinally aligned arrangements or is substantially parallel to a local tangent of the layup surface 116 for circumferentially aligned arrangements. In other implementations, the fastener 118 is substantially orthogonal to the layup surface 116 for longitudinally aligned arrangements or is substantially orthogonal to a local tangent of the layup surface 116 for circumferentially aligned arrangements. Alternatively, the fastener 118 is substantially orthogonal to a particular interlock surface 132, 134 or an intermediate surface 534, 538 of the tool assembly 102.

In some implementations, a joint formed by the first and second joint portions includes one or more gaps defined by surfaces of the first and second joint portions. For example, the joint 302, 304 include the gaps 602-606, as described with reference to FIG. 6. In some such implementations, the joint includes adhesive material positioned in the one or more gaps in between surfaces the first and second joint portions. The adhesive material is configured to maintain vacuum integrity of the joint. For example, one or more of the gaps 602-606 of the joint 302, 304 include the adhesive material 612 on at least a portion of one of the surfaces thereof, as described with reference to FIG. 6.

In some implementations, prior to joining the first piece and the second piece, the method 1400 further includes applying an adhesive paste or an adhesive film to at least a portion of the first joint portion of the first piece. For example, the adhesive material 612 of FIG. 6 may be applied to surfaces corresponding to the gaps 602-606 of the joint portions 122, 124 as a paste or a film, as described with reference to FIGS. 1 and 6.

In a particular implementation, the fastener does not pass through interlock surfaces or angled interlock surfaces. For example, the fastener assembly 702 of FIG. 7 and the second fastener assembly 802 of FIG. 8 do not extend through any of the interlock surfaces 132, 134, 516, 536, as described with reference to FIGS. 7 and 8.

In some implementations, the tool assembly further includes one or more second fasteners configured to couple the first piece to the second piece. For example, a particular tool assembly 102 includes the fastener assembly 702 and one or more second fastener assemblies 802, as described with reference to FIG. 8. In some such implementations, the fastener, the one or more second fasteners, or a combination thereof, include or correspond to a spring-loaded device or a blind fastener configured to allow thermal expansion of the tool assembly. For example, the fastener includes or corresponds to the fastener assembly 702 of FIG. 7 and the second fastener assembly 802 of FIG. 8 including the spring 716 or a biasing member. In a particular implementation, the one or more second fasteners are substantially orthogonal to the fastener. For example, the fastener assembly 702 is oriented with or parallel to the longitudinal axis 254 and the one or more second fasteners are oriented with or parallel the vertical axis 252, as described with reference to FIGS. 7 and 8.

In some implementations where the joint portions 122, 124 correspond to the joint portions of FIG. 5 and include the obtuse angle corners 552, 554, 556, 574, 576 and the acute angle corner 572, the obtuse angle corners are at approximately 135 degrees and the acute angle corner is at approximately 45 degrees. For example, the angles are manufactured within design tolerances or plus or minus 5 degrees. In such implementations, the angle of the corners reduces normal and shear stresses on the joints 302, 304. In some implementations, the corners include or correspond to filleted corners, chamfered corners, or a combination thereof. Such corners reduce normal and shear stresses (e.g., prevent or reduce local maximums of stresses) on the joints 302, 304.

In some implementations, the first piece includes a material that has an anisotropic coefficient of thermal expansion. For example, the first piece 112 may have a 10 times greater coefficient of thermal expansion in one axis (e.g., the longitudinal axis 254) than another axis (e.g., the vertical axis 252). In some such implementations, the first pieces includes a thermoplastic polymer material (e.g., ABS material or carbon filled ABS material), a thermoset polymer material, or another polymer material.

In some implementations, the first joint portion of the first piece further includes a third interlock surface, a first intermediate surface, and a second intermediate surface. The first intermediate surface and each of the first and second interlock surfaces form obtuse angle corners. The second intermediate surface and the second interlock surface forms another obtuse angle corner. For example, the first intermediate surface 514 and each of the first and third interlock surfaces 132, 516 form obtuse angle corners 554, 556, and the second intermediate surface 518 and the third interlock surface 516 form another obtuse angle corner 558, as described with reference to FIG. 5. In a particular implementation, the second intermediate surface and a vertical edge surface form a substantially right angle corner. For example, the second intermediate surface 518 and the vertical edge surface 520 form a substantially right angle corner 560, as described with reference to FIG. 5. Additionally or alternatively, the second joint portion of the second piece further includes a fourth interlock surface, a first intermediate surface, and a second intermediate surface. The first intermediate surface and each of the first and second interlock surfaces form obtuse angle corners. The second intermediate surface and the second interlock surface form another obtuse angle corner. For example, the first intermediate surface 534 and each of the second and fourth interlock surfaces 134, 536 form obtuse angle corners 574, 576, and the second intermediate surface 538 and the fourth interlock surface 536 form another obtuse angle corner 578, as described with reference to FIG. 5.

In some implementations, the second piece further includes a third joint portion. The third joint portion having a shape similar to the first joint portion or the second joint portion and configured to join with a fourth joint portion of a third piece of the tool assembly. For example, the second piece 114 includes a third joint portion 422 that interlocks with the fourth joint portion 424 of the third piece 202, as described with reference to FIGS. 3 and 4.

Figure 15:
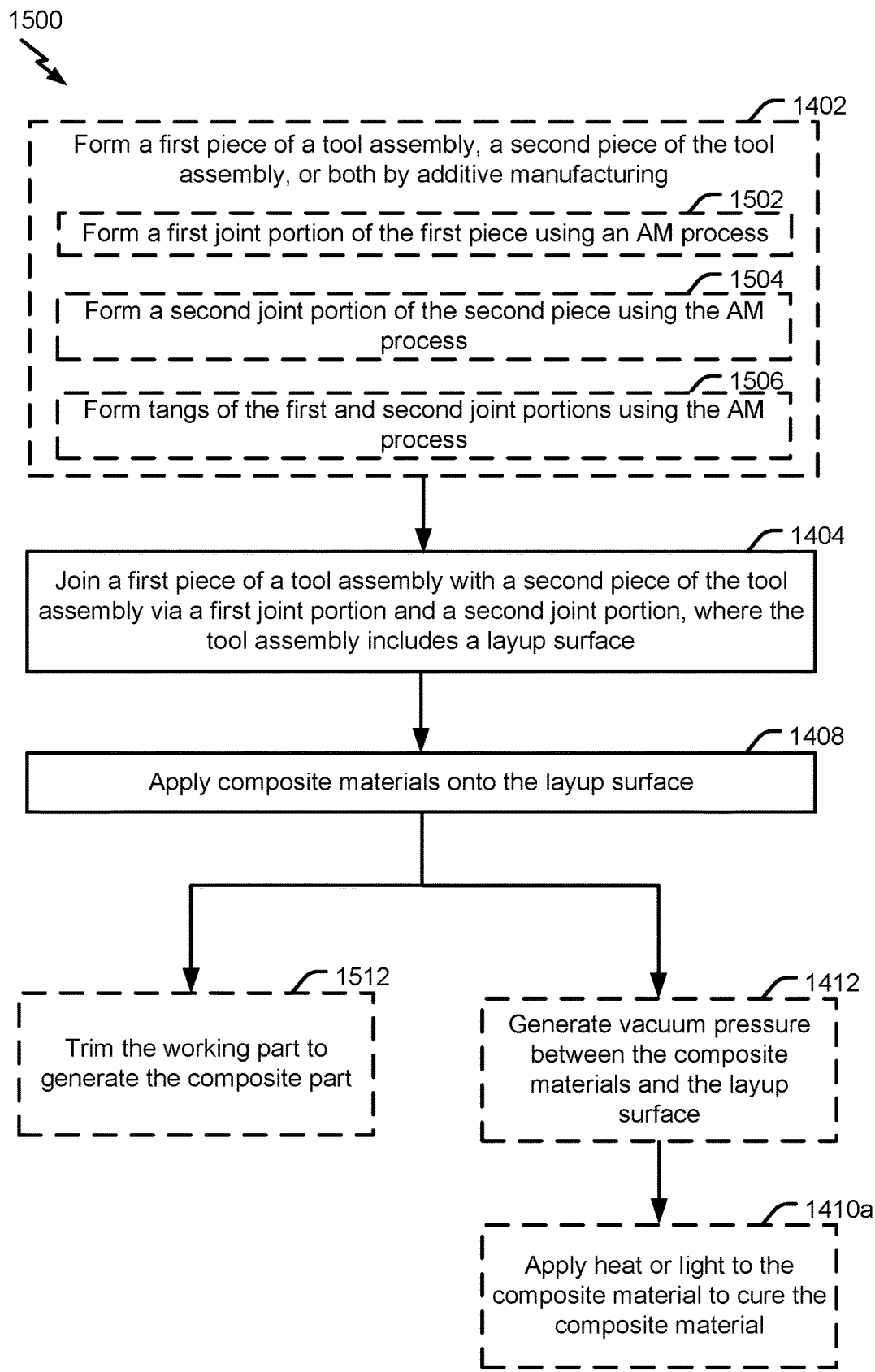
FIG. 15 is a flow chart of another example of a method of applying composite material to a tool assembly.

FIG. 15 illustrates a particular example of a method 1500 of applying composite material to a tool assembly, such as the tool assembly 102. The method 1500 may be performed by the composite part manufacturing system 100, the layup device, 104, the curing device 108 of FIG. 1, or a combination thereof, as illustrative, non-limiting examples. The tool assembly 102 may include one or more joints as described with reference to FIGS. 3-8 and 9A-9O. In FIG. 15, optional steps of the method 1500 are illustrated as dashed boxes.

In some implementations, the method 1500 includes, at 1402, forming a first piece 112 of a tool assembly 102, a second piece 114 of the tool assembly 102, or both by additive manufacturing, as described with reference to FIG. 14. In a particular implementation, forming 1402 includes forming a first joint portion 122 of the first piece 112 of the tool assembly 102 using an additive manufacturing process. The first joint portion 122 includes a top surface 136a and at least a first interlock surface 132. Forming 1402 further includes forming the second joint portion 124 of a second piece 114 of the tool assembly 102 using the additive manufacturing process. The second joint portion 124 includes a top surface 136b and at least a second interlock surface 134 that is complementary to the first interlock surface 132.

In some implementations, forming 1402 the first joint portion 122 includes forming an obtuse angle corner 552 between the first interlock surface 132 and the top surface 136 of the first joint portion 122 using the additive manufacturing process. Additionally, forming the second joint portion 124 includes forming an acute angle corner 572 between the second interlock surface 134 and the top surface 136b of the second joint portion 124 using the additive manufacturing process.

In some implementations, forming 1402 further includes forming tangs 582, 584 of the first and second joint portions using the additive manufacturing process. In some implementations, forming 1402 the first and second joint portions 122, 124 using the additive manufacturing process includes forming the first and second pieces using at least one of a fused filament fabrication process, a plastic jet printing process, a three-dimensional printing process, a powder bed processing process, a selective heat sintering process, a fused deposition modeling process, a stereolithography process, a selective laser sintering process, or a selective laser melting process.

The method 1500 includes, at 1404, joining the first piece 112 of the tool assembly 102 with the second piece 114 of the tool assembly 102 via a first joint portion 122 and a second joint portion 124, where the tool assembly 102 includes a layup surface 116. The first and second joint portions may be joined 1404 by hand or by machinery and may be joined 1404 using the joint portions along with applying fasteners, adhesives, or both, as described with reference to FIG. 1. As another example, the joint portions may correspond to joint portions of FIGS. 9A-9O.

The method 1500 includes, at 1408, applying composite material 142 onto the layup surface 116. The layup surface 116 is configured to support formation of a composite part 190 and has a shape that is complementary to a shape of the composite part 190. In some implementations, applying composite material 142 onto the layup surface 116 includes depositing or placing the composite material 142 manually or by an automated device. For example, the composite material 142 may be deposited or placed by the layup device 104 to form the composite part 190, as described with reference to FIG. 1. Alternatively, the composite material 142 deposited or placed onto the layup surface 116 defines or corresponds to a working part (e.g., a not yet completed composite part), such as the working part 192 of FIG. 1. In such implementations, the method 1500 further includes, at 1136a, trimming the working part 192 to generate the composite part 190, as described with reference to FIG. 1.

In some implementations, the method 1500 further includes, at 1412, generating vacuum pressure between the composite material 142 and the layup surface 116. For example, the vacuum system 106 generates vacuum pressure or vacuum conditions between the composite material 142 and the layup surface 116 of the tool assembly 102 responsive to receiving commands from the controller 110, as described with reference to FIG. 1.

In some implementations, the method 1500 further includes, at 1410a, applying heat and/or light to cure the composite material 142 and form the composite part 190. For example, the curing device 108 applies 1410a heat and/or light to the composite material 142 to cure the composite material 142 and form the composite part 190, as described with reference to FIG. 1. As illustrated in FIG. 15, heat may be applied 1410a to the tool assembly 102 after the vacuum pressure is optionally generated at 1412. In other implementations, the heat and/or light is applied 1410a to the tool assembly without generating the vacuum pressure at 1412, prior to the vacuum pressure being generated at 1412, or at least partially concurrently with the vacuum pressure being generated at 1412.

In some implementations, the tool assembly 102 further includes adhesive material 612 adhering the first piece to the second piece. For example, adhesive paste or adhesive film is applied to the intermediate surfaces 514, 534 of the tool assembly 102, as described with reference to FIG. 6.

In some implementations, the tool assembly 102 of the method 1400 or 1500 is an additively manufactured tool assembly, e.g., one or more of the pieces 112, 114, 202 thereof are made by an additive manufacturing process, such as fused filament fabrication, such as fused deposition modeling, plastic jet printing, 3-D printing, powder bed processing, selective heat sintering, selective laser sintering, stereolithography, selective laser melting, and the like. Because the tool assembly 102 has reduced costs and fabrication time, using the tool assembly 102 to fabricate the composite parts 190 has reduced costs and fabrication time, as compared to using metal tools and tool assemblies. Additionally, by using the tool assembly 102 including one or more of the joints described herein, the composite part manufacturing system 100 of FIG. 1 can form larger composite parts as compared to using smaller tool assemblies joined by butt joints to form smaller composite parts.

The method 1400 of FIG. 14 and/or the method 1500 of FIG. 15 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 1400 of FIG. 14 and/or the method 1500 of FIG. 15 can be initiated or controlled by one or more processors, such as one or more processors included in or coupled to the controller 110 of the composite part manufacturing system 100. In some implementations, one or more operations of one of the methods FIG. 14 or 15 may be combined with one or more operations of the other of the methods of FIG. 14 or 15. Additionally, one or more operations described with reference to the methods of FIG. 14 or 15 may be optional, may be performed in a different order than shown or described, or both. Additionally, two or more operations described with reference to the methods of FIG. 14 or 15 may be performed at least partially concurrently.

Figure 16:
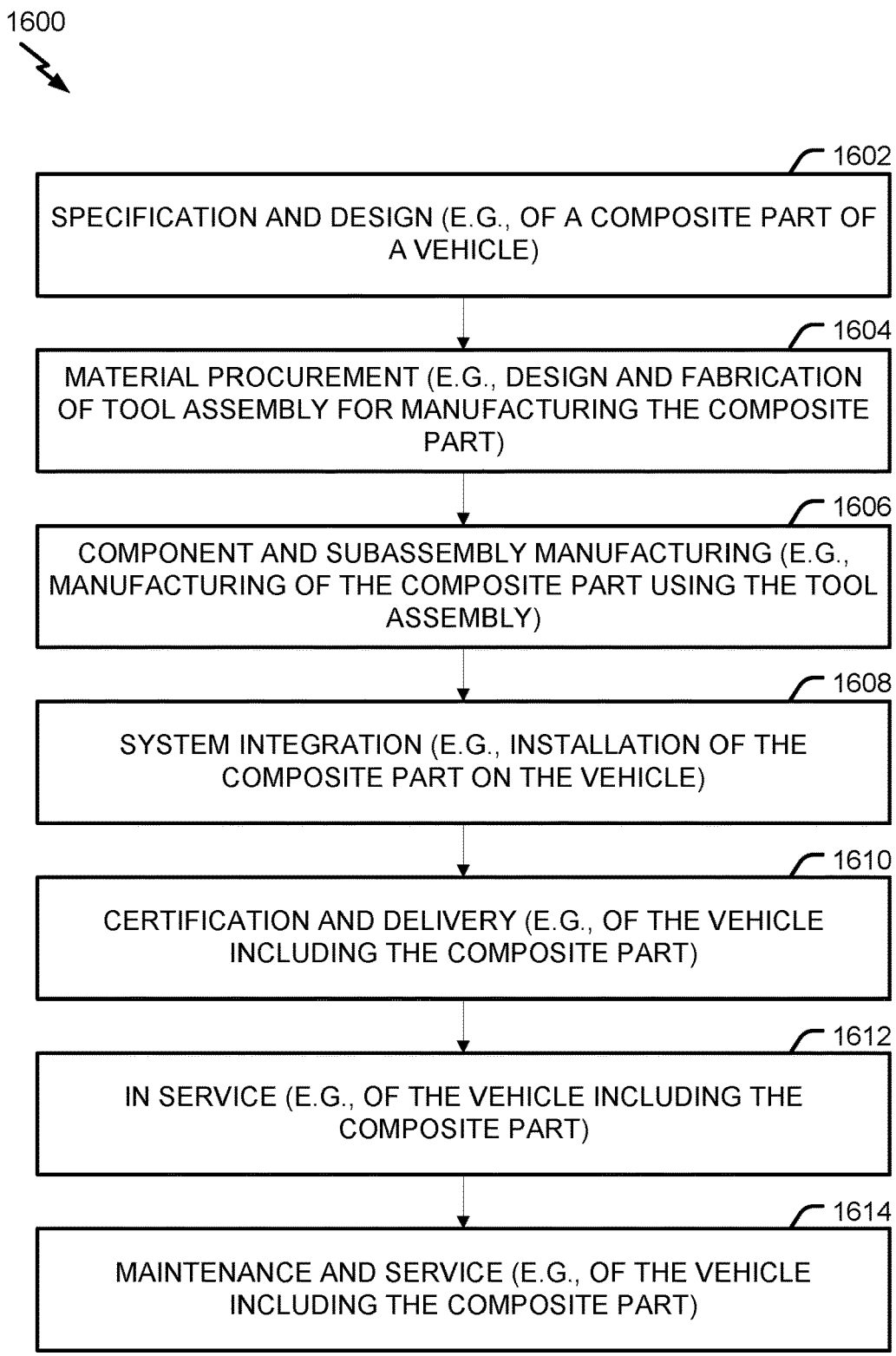
FIG. 16 is a flow chart of an example of a method of operating a composite part manufacturing system.
Figure 17:
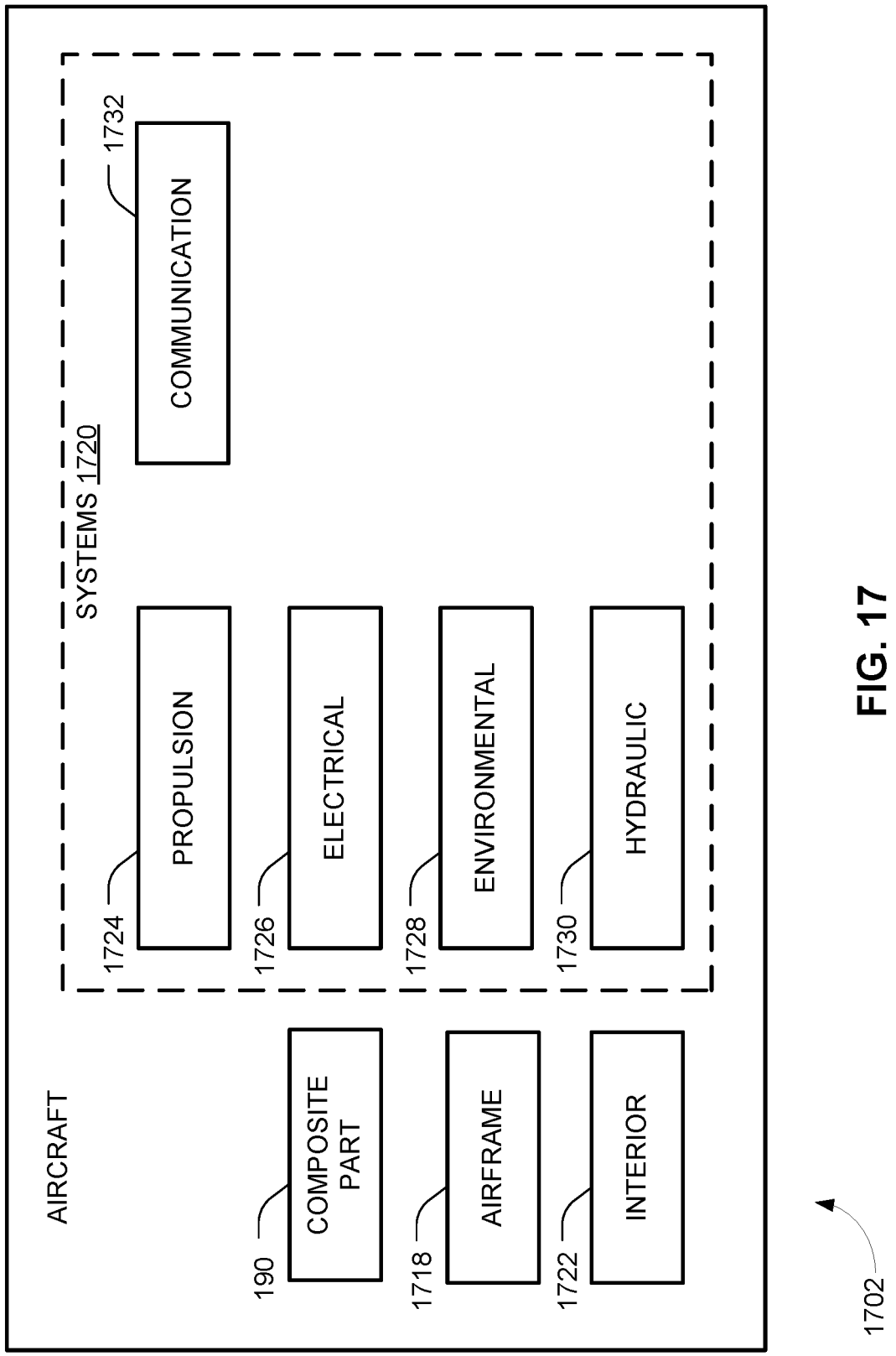
FIG. 17 is a block diagram of an illustrative implementation of a vehicle that includes a composite part formed using a tool assembly.

Referring to FIGS. 16 and 17, examples of the disclosure are described in the context of a vehicle manufacturing and service method 1600 as illustrated by the flow chart of FIG. 16 and a vehicle 1702 as illustrated by the block diagram of FIG. 17. A vehicle produced by the vehicle manufacturing and service method 1600 of FIG. 16, such as the vehicle 1702 of FIG. 17, may include an aircraft, an airship, a rocket, a satellite, a submarine, a ship, an automobile, or another vehicle, as illustrative, non-limiting examples. The vehicle 1702 may be manned or unmanned (e.g., a drone or an unmanned aerial vehicle (UAV)).

Referring to FIG. 16, a flowchart of an illustrative example of a method of composite part manufacturing and service is shown and designated 1600. During pre-production, the exemplary method 1600 includes, at 1602, specification and design of a vehicle, such as a vehicle 1702 described with reference to FIG. 17. During the specification and design of the vehicle 1702, the method 1600 may include specifying a design of a composite part, such as a composite part 190 of FIG. 1. At 1604, the method 1600 includes material procurement. For example, the method 1600 may include procuring materials (e.g., design and fabrication of the tool assembly 102 of FIG. 1) for the vehicle 1702.

During production, the method 1600 includes, at 1606, component and subassembly manufacturing and, at 1608, system integration of the vehicle 1702. The method 1600 may include component and subassembly manufacturing (e.g., manufacturing the composite part 190 of FIG. 1) of the vehicle 1702 and system integration (e.g., coupling the composite part 190 of FIG. 1 to one or more components of the vehicle 1702). For example, at 1606, the system 100 of FIG. 1 can implement method 1400 of FIG. 14 and/or method 1500 of FIG. 15 to manufacture the composite part 190 that is then assembled at 1608 to manufacture the vehicle 1702.

At 1610, the method 1600 includes certification and delivery of the vehicle 1702 and, at 1612, placing the vehicle 1702 in service. Certification and delivery may include certifying the composite part 190 of FIG. 1 by inspection or non-destructive testing. While in service by a customer, the vehicle 1702 may be scheduled for routine maintenance and service, which may also include modification, reconfiguration, refurbishment, and so on. At 1614, the method 1600 includes performing maintenance and service on the vehicle 1702. The method 1600 may include performing maintenance and service of the composite part 190. For example, maintenance and service of the communications system may include replacing the composite part 190 or repairing a surface of the composite part 190.

Each of the processes of the method 1600 may be performed or carried out by a system integrator, a third party, and/or an operator (e.g., a customer). For the purposes of this description, a system integrator may include without limitation any number of vehicle manufacturers and major-system subcontractors; a third party may include without limitation any number of venders, subcontractors, and suppliers; and an operator may be an airline, leasing company, military entity, service organization, and so on.

Referring to FIG. 17, a block diagram of an illustrative implementation of the vehicle 1702 that includes a composite part formed using a tool assembly, such as the tool assembly 102 of FIG. 1. To illustrate, the vehicle 1702 may include an aircraft, as an illustrative, non-limiting example. The vehicle 1702 may have been produced by at least a portion of the method 1600 of FIG. 16. As shown in FIG. 17, the vehicle 1702 (e.g., an aircraft) may include an airframe 1718, an interior 1722, the composite part 190, and a plurality of systems 1720. In other implementations, the airframe 1718 includes or corresponds to the composite part 190. For example, the composite part 190 may include or correspond to a wing, a section of the wing, a section of a fuselage, or other airframe 1718 components. The plurality of systems 1720 may include one or more of a propulsion system 1724, an electrical system 1726, an environmental system 1728, a hydraulic system 1730 or a communication system 1732. The composite part 190 is formed or manufactured using the tool assembly 102. The composite part 190 may be manufactured by the composite part manufacturing system 100 of FIG. 1. For example the composite part 190 may be manufactured by one or more steps of the methods 1400 and 1500 of FIGS. 14 and 15 and/or as described with reference to FIG. 1.

Apparatus and methods included herein may be employed during any one or more of the stages of the method 1600 of FIG. 16. For example, components or subassemblies corresponding to production process 1608 may be fabricated or manufactured in a manner similar to components or subassemblies produced while the vehicle 1702 is in service, at 1612 for example and without limitation. Also, one or more apparatus implementations, method implementations, or a combination thereof may be utilized during the production stages (e.g., stages 1602-1610 of the method 1600), for example, by substantially expediting assembly of or reducing the cost of the vehicle 1702. Similarly, one or more of apparatus implementations, method implementations, or a combination thereof, may be utilized while the vehicle 1702 is in service, at 1612 for example and without limitation, to maintenance and service, at 1614.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A tool assembly, comprising:
 a first piece, comprising a first joint portion that comprises a top surface and at least a first interlock surface;
 a second piece, comprising a second joint portion, configured to interlock with the first joint portion, the second joint portion comprising a second top surface and at least a second interlock surface that is complementary to the first interlock surface; and
 a fastener, extending through the first joint portion and through the second joint portion, wherein:
  the fastener comprises a spring-loaded device that comprises a spring oriented to compress along a first axis responsive to thermal expansion of the tool assembly;
  the first axis is parallel to a first surface, defined by the top surface of the first piece;
  the first interlock surface and the top surface form an obtuse-angle corner;
  the second interlock surface and the second top surface form an acute-angle corner; and
  the first interlock surface is configured to contact the second interlock surface to inhibit relative movement between the first piece and the second piece along a longitudinal axis of the tool assembly.

2. The tool assembly of claim 1, wherein the fastener extends through tangs of the first joint portion and the second joint portion.

3. The tool assembly of claim 1, further comprising one or more second fasteners configured to couple the first piece to the second piece.

4. The tool assembly of claim 1, wherein the first interlock surface has a first surface portion and a second surface portion, wherein the second interlock surface has a third surface portion and a fourth surface portion, wherein the first surface portion is configured to directly couple to the third surface portion while the first interlock surface contacts the second interlock surface, and wherein the second surface portion is configured to form a gap with the fourth surface portion while the first interlock surface contacts the second interlock surface.

5. The tool assembly of claim 1, wherein the obtuse-angle corner is at approximately 135 degrees and the acute-angle corner is at approximately 45 degrees.

6. The tool assembly of claim 1, wherein the first piece comprises a material that has an anisotropic coefficient of thermal expansion.

7. The tool assembly of claim 1, further comprising an adhesive material and a joint, formed by the first joint portion and the second joint portion;
wherein:
the joint comprises one or more gaps, defined by surfaces of the first joint portion and the second joint portion;
the adhesive material is positioned in the one or more gaps; and
the adhesive material is configured to maintain vacuum integrity of the joint.

8. The tool assembly of claim 1, further comprising composite material, coupled to a layup surface of the first piece or a layup surface of the second piece.

9. The tool assembly of claim 1, wherein:
the first joint portion of the first piece comprises a first tang;
the second joint portion of the second piece comprises a second tang; and
the first tang is in contact with the second tang.

10. The tool assembly of claim 1, wherein the fastener comprises a screw, a bolt, a washer, a nut, a biasing member, or a combination thereof.

11. A tool assembly comprising:
a first piece, comprising a top surface and a first joint portion, the first joint portion comprising at least a first interlock surface;
a second piece, comprising a second joint portion, configured to interlock with the first joint portion, the second joint portion comprising a second top surface and at least a second interlock surface that is complementary to the first interlock surface;
a first fastener, extending through the first joint portion and through the second joint portion; and
a second fastener, extending through the first joint portion and through the second joint portion,
wherein:
the first fastener comprises a spring-loaded device that comprises a spring oriented to compress along a first axis responsive to thermal expansion of the tool assembly;
the first axis is parallel to a first surface, defined by the top surface of the first piece;
the first interlock surface and the top surface form an obtuse-angle corner;
the second interlock surface and the second top surface form an acute-angle corner; and
the first interlock surface is configured to contact the second interlock surface to inhibit relative movement between the first piece and the second piece along a longitudinal axis of the tool assembly.

12. The tool assembly of claim 11, wherein the second fastener comprises a second spring-loaded device, and wherein a second spring of the second spring-loaded device is configured to compress along a second axis responsive to the thermal expansion of the tool assembly, the second axis perpendicular to the first surface defined by the top surface of the first piece.

13. The tool assembly of claim 11, wherein at least one of the acute-angle corner or the obtuse-angle corner is a filleted corner or a chamfered corner.

14. The tool assembly of claim 11, wherein:
the first piece further comprises a third interlock surface, a first intermediate surface, and a second intermediate surface;
the first intermediate surface and each of the first interlock surface and the second interlock surface form obtuse-angle corners; and
the second intermediate surface and the second interlock surface form another obtuse-angle corner.

15. The tool assembly of claim 11, wherein the second piece further comprises a third joint portion, the third joint portion having a shape similar to the first joint portion or the second joint portion and configured to join with a fourth joint portion of a third piece of the tool assembly.

16. The tool assembly of claim 11, further comprising:
an adhesive material, adhering the first piece to the second piece; and/or
an annular ring seal, positioned between the first interlock surface and the second interlock surface.

17. The tool assembly of claim 16, further comprising a support plate, configured to generate a vacuum seal between the first piece and the second piece via the annular ring seal.

18. The tool assembly of claim 16, further comprising a vacuum bag, configured to generate a vacuum seal between the first piece and the second piece via the annular ring seal.

19. The tool assembly of claim 16, wherein the adhesive material comprises thermoset polyimides, benzoxazine resins, bis-maleimides, thermoset polyurethanes, phenolics, vinyl esters, or a combination thereof.

20. The tool assembly of claim 16, wherein the adhesive material is an adhesive film.

* * * * *